(12) United States Patent
Cohen et al.

(10) Patent No.: US 12,067,523 B2
(45) Date of Patent: Aug. 20, 2024

(54) BAGGAGE HANDLING VERIFICATION DEVICE, SYSTEM AND METHOD

(71) Applicant: Ramp Holdings Pty Ltd., St. Peters (AU)

(72) Inventors: Kevin Cohen, St. Peters (AU); Mark Beacroft, St. Peters (AU); Patrick Moulds, St. Peters (AU)

(73) Assignee: RAMP HOLDINGS PTY LTD., St. Peters (AU)

( * ) Notice: Subject to any disclaimer, the term of this patent is extended or adjusted under 35 U.S.C. 154(b) by 0 days.

(21) Appl. No.: 17/943,369

(22) Filed: Sep. 13, 2022

(65) Prior Publication Data

US 2023/0060170 A1 Mar. 2, 2023

Related U.S. Application Data

(63) Continuation-in-part of application No. 17/134,568, filed on Dec. 28, 2020, now Pat. No. 11,443,126.

(30) Foreign Application Priority Data

Dec. 28, 2019 (AU) .................................. 2019904959

(51) Int. Cl.
*G06Q 10/0833* (2023.01)
*G06K 7/10* (2006.01)

(52) U.S. Cl.
CPC ..... *G06Q 10/0833* (2013.01); *G06K 7/10297* (2013.01); *G06K 2007/10504* (2013.01)

(58) Field of Classification Search
CPC ........................ G06Q 10/0833; G06K 7/10297

USPC .......................................................... 235/451
See application file for complete search history.

(56) References Cited

U.S. PATENT DOCUMENTS

| 2005/0040961 | A1* | 2/2005 | Tuttle | ........... | B22F 7/06 |
| | | | | | 340/10.5 |
| 2012/0274450 | A1* | 11/2012 | Tuttle | ........... | G08B 21/0258 |
| | | | | | 340/10.1 |
| 2018/0022473 | A1* | 1/2018 | Jacobsen | ........... | B65G 43/08 |
| | | | | | 198/301 |
| 2021/0130009 | A1* | 5/2021 | Yim | ........... | G06K 7/10425 |
| 2023/0060170 | A1* | 3/2023 | Cohen | ........... | G06Q 10/0833 |

* cited by examiner

*Primary Examiner* — Allyson N Trail
(74) *Attorney, Agent, or Firm* — Rivka Friedman

(57) ABSTRACT

A baggage handling verification device (200) is for use with baggage (46) having RFID tags (48) attached. A user interface emits signals, an attachment element (22, 28, 222, 228) attaches the device to a user, an RFID antenna (232) and reader (234) obtain tag data representing first parameters for determining a baggage handling method. Data memory (242) stores second parameters for determining a baggage handling method. A CPU (238) compares the first and second parameters. The device emits different signals depending on whether a match exists between the parameters. Match-indicating signals indicate to handle a baggage item according to a predetermined method, while no-match indicating signals indicate not to handle the baggage item according to that method. The invention also covers a related system including the verification device and method of determining whether the baggage item must be handled according to predetermined baggage handling parameters.

19 Claims, 6 Drawing Sheets

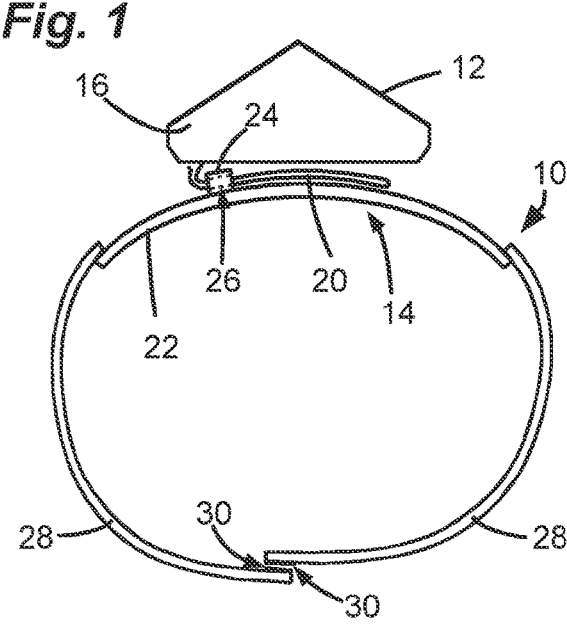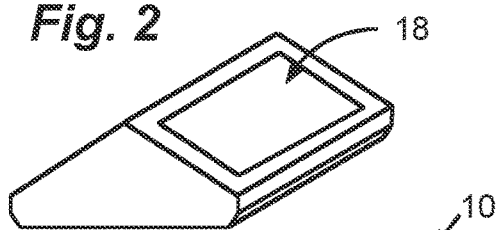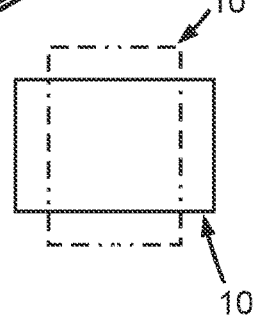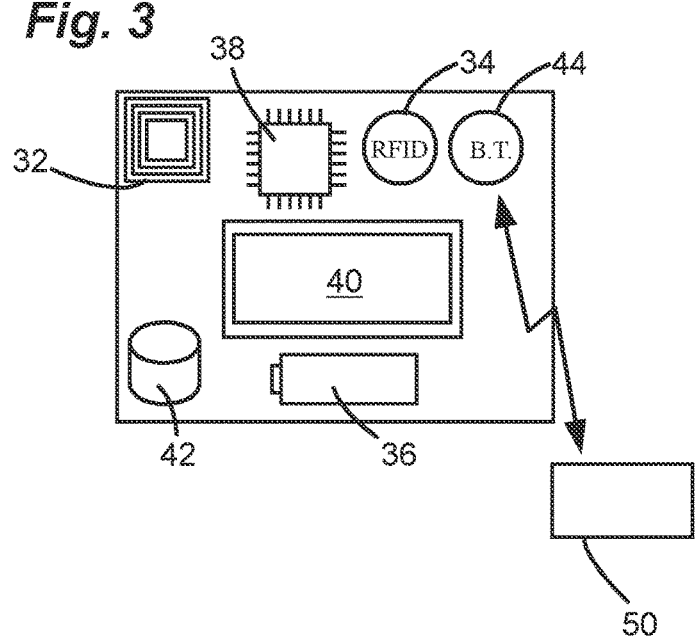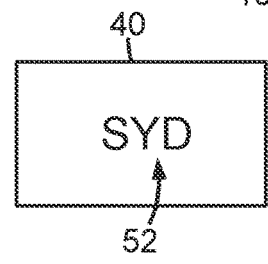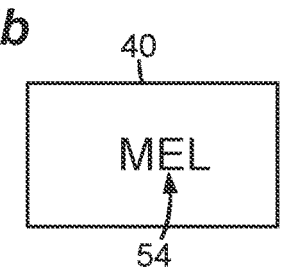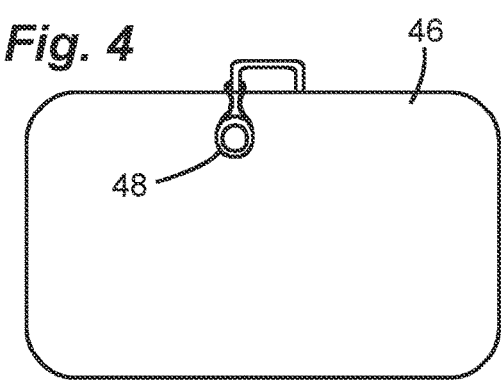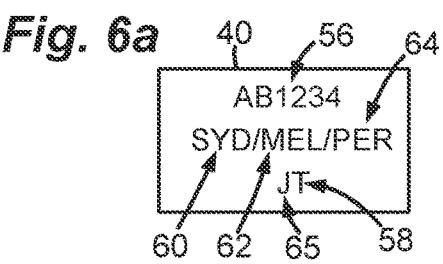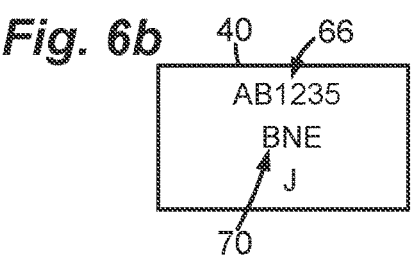

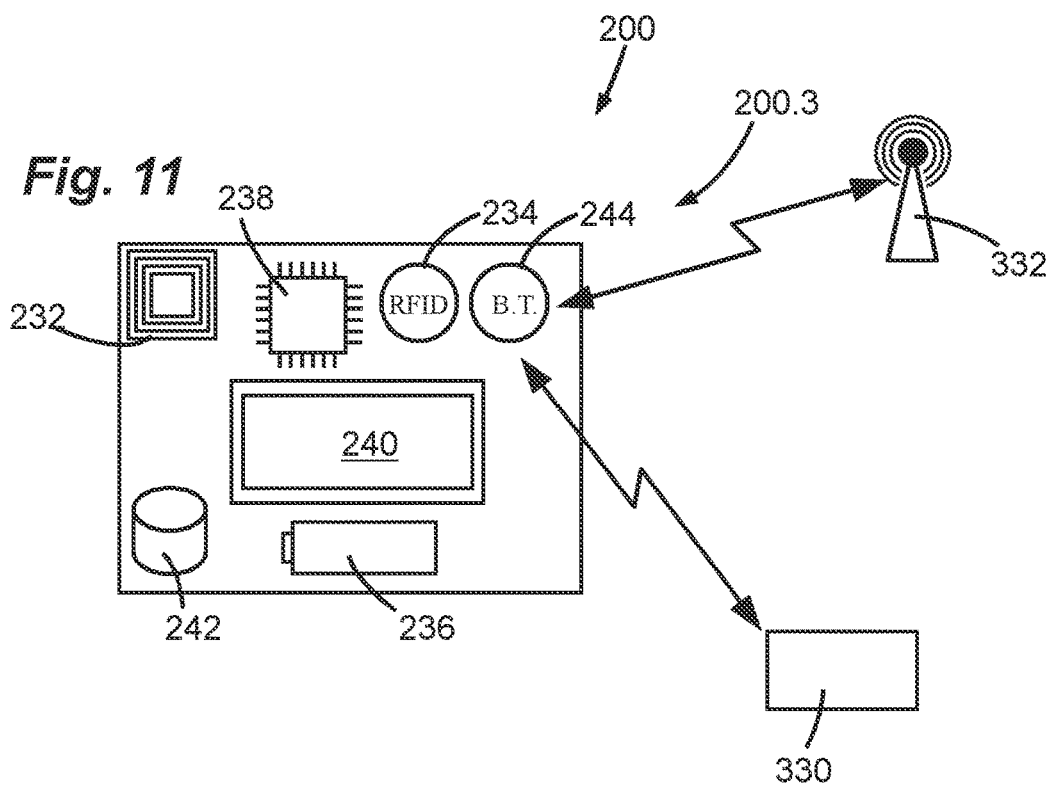
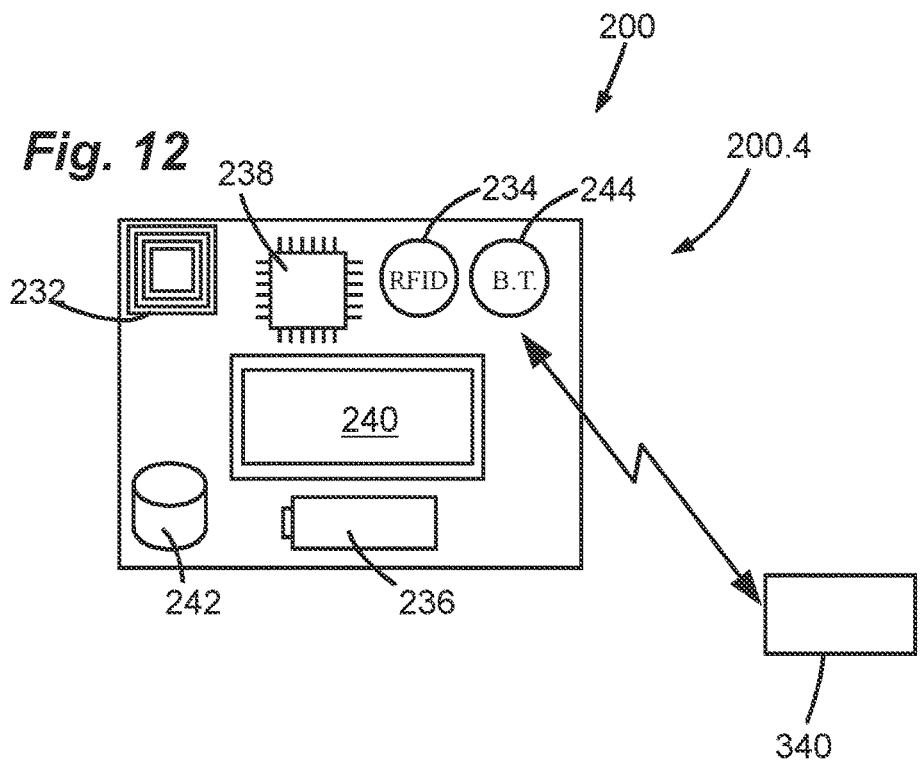

BAGGAGE HANDLING VERIFICATION DEVICE, SYSTEM AND METHOD

FIELD OF THE INVENTION

This invention relates to a baggage handling verification device for use with items of baggage to which are attached radio-frequency identification (RFID) baggage tags containing tag data; to a system including such a device; and to a method involving use of the device.

The device, system and method are for determining whether the items of baggage are to be handled in accordance with data stored on the tags attached to the baggage items.

BACKGROUND TO THE INVENTION

Due to the large volume of passenger baggage handled at airports across the globe, misdirection and loss of baggage is a common problem. Lost items of baggage are often located and returned to their owners, but the temporary loss of the baggage can cause passengers great inconvenience and stress. The problem of lost baggage is all the worse when the baggage cannot be located at all.

Apart from the disadvantages of this issue to the passengers, it can also result in significant costs to airlines and airports and other locations where passenger baggage is handled, not only in lost time, but also as a result of claims for compensation made by passengers whose baggage is lost.

It is known to use scanning devices to check details of baggage from tags or other data storage items applied or attached to items of baggage. Indeed, one specific example of such devices involves the use of RFID tags that are attached to items of baggage and RFID reader devices that can interrogate the tags to determine relevant details such as departure and destination ports of the baggage, whether the baggage has a particular status applied to it such as baggage that is to be handled as premium baggage, details of baggage owners, and so on.

Such RFID readers are often portable and can be held by baggage handlers and positioned to scan RFID tags on baggage. However, given the typical weight of baggage, each time a baggage handler uses such a device to obtain relevant data from a piece of baggage, the handler will have to put the scanner down (often on a scanner cradle, stand or the like) in order for the baggage handler's hands to be freed up to lift and move the baggage as required. The repeated need to retrieve such a scanner for use and then to put it down after use as described is not only inconvenient for baggage handlers but can add significantly to the overall time required to handle such baggage especially where large volumes of baggage are involved.

In addition, such scanners are typically connected to display devices such as monitors or mobile phones which are adapted to display information read from the RFID tags together with other information relating, for example, to desired destinations of the baggage, levels of priority with which the baggage is to be handled, and so on. Each time a baggage handler scans an RFID tag on an item of baggage, the hander will need to consult and read the information shown on the display to check and confirm that the baggage is about to be handled in the appropriate manner. This, too, can give rise to great inconvenience for baggage handlers and can add further to the time required to handle such baggage.

It is an object of the present invention to overcome or ameliorate disadvantages of the prior art or to provide a useful alternative thereto.

SUMMARY OF THE INVENTION

According to a first aspect of the invention there is provided a baggage handling verification device for use with baggage to which is fixed an RFID baggage tag containing data, the device including:
- a device user interface adapted to emit user-detectable signals;
- at least one device attachment element adapted to releasably attach the device to a part of the body, other than the hands, of a user of the device;
- an RFID signal receiving antenna;
- an RFID reader adapted to read data received by the antenna from the tag, that data representing first parameters for use in determining a manner of handling baggage;
- data memory adapted for storing data representing second parameters for use in determining a manner of handling baggage; and
- a CPU adapted
  - to compare the first parameters represented by data read by the RFID reader with the second parameters represented by data stored in the data memory,
  - to determine if there is a match between the first parameters and second parameters,
  - to cause the user interface to emit at least one first predetermined user-detectable signal if the CPU determines that there is a match between the first parameters and second parameters, and
  - to cause the user interface to emit at least one second predetermined user-detectable signal if the CPU determines that there is no match between the first parameters and second parameters.

In a preferred embodiment of the first aspect of the invention, the baggage handling verification device is adapted to enable acquiring of the data representing second parameters from a remote data source prior to storage of that data in the data memory.

Preferably, the baggage handling verification device is adapted to have an operational criterion, and to enable acquiring of the data representing second parameters from the remote data source only if said operational criterion is met.

In one preferred embodiment of the first aspect of the invention, the remote data source is an electronic, data handling, companion device, wherein said operational criterion is that the verification device is adapted to be connected to the companion device so as to enable transfer of electronic data between the verification device and the companion device, with the verification device being in such proximity to the companion device that a user using the verification device by hand can simultaneously, by hand, operate the companion device, thereby to enable the user to cause the data representing second parameters to be transferred to the verification device from the companion device.

In another preferred embodiment of the first aspect of the invention, said operational criterion is that the verification device is adapted to prompt the remote data source to initiate a data obtaining process for transferring the data representing second parameters from the remote data source to the verification device.

Preferably, the baggage handling verification device is adapted
- to enable selection by the user, as part of said data obtaining process, of any one of a plurality of selectable options wherein each of said options corresponds to a respective available selection of second parameters; and
- if an option of said plurality of options is selected, to transmit to the remote data source data indicating the selected option.

In a further preferred embodiment of the first aspect of the invention, said operational criterion is that the verification device is adapted to store location information being information about a location of the verification device, and to transfer data representing the location information to the remote data source to prompt transfer of said data representing second parameters from the remote data source to the verification device with those second parameters being based on said location.

Then, preferably, the verification device is adapted to acquire the location information from a location identifying device separate from the verification device.

Preferably, the verification device is adapted to acquire the location information from the location identifying device by Bluetooth™ transmission.

Preferably, the verification device is adapted to acquire the location information from the location identifying device automatically when the verification device moves into sufficient proximity to the location identifying device.

In a preferred embodiment of the invention, the verification device is adapted to acquire the location information from the location identifying device automatically when the verification device moves into sufficient proximity to the location identifying device such that a Bluetooth™ connection is established between the verification device and the location identifying device.

In yet a further preferred embodiment of the first aspect of the invention, said operational criterion is that the verification device has a unique identifier and is adapted to transmit data representing said unique identifier to the remote data source and to prompt the transmission of said data representing second parameters from the remote data source to the verification device, with that data being based on the unique identifier.

According to a second aspect of the invention there is provided a baggage handling verification system for use with baggage to which is fixed an RFID baggage tag containing data, the system including:
- a baggage handling verification device according to the first aspect of the invention
  - wherein the baggage handling verification device is adapted to enable acquiring of the data representing second parameters from a remote data source prior to storage of that data in the data memory; and
  - the baggage handling verification device is adapted to have an operational criterion, and to enable acquiring of the data representing second parameters from the remote data source only if said operational criterion is met; and
- said remote data source.

In one preferred embodiment of the second aspect of the invention, the remote data source is a first remote data source being an electronic, data handling, companion device;
- the baggage handling verification system includes a second remote data source that is remote from the verification device and from the companion device; and
- the companion device is adapted to receive the data representing second parameters from the second remote data source;
- the verification device is adapted to be connected to the companion device so as to enable transfer of electronic data between the verification device and the companion device, with the verification device being in such proximity to the companion device that a user using the verification device by hand can simultaneously, by hand, operate the companion device, thereby to enable the user to cause the data representing second parameters to be transferred to the verification device from the companion device.

Then, preferably,
- the companion device is adapted to prompt the second remote data source to initiate a data obtaining process for transferring the data representing second parameters from the second remote data source to the companion device;
- the second remote data source is adapted, once the initiation of said process is prompted, to transmit to the companion device initial data representing a plurality of selectable options, each of said options corresponding to a respective available selection of second parameters;
- the companion device is adapted to receive said initial data and to enable selection of any one of the selectable options by the user, and if an option of said plurality of options is selected, to transmit to the second remote data source data indicating the selected option;
- the second remote data source is adapted to transmit the data representing second parameters from the second remote data source to the companion device wherein the second parameters correspond to the selected option; and
- the companion device is adapted to transfer, to the verification device, the data representing second parameters corresponding to the selected option as received from the second remote data source.

Preferably, the companion device is a mobile smart phone.

In another preferred embodiment of the second aspect of the invention,
- the verification device is adapted to prompt the remote data source to initiate a data obtaining process for transferring the data representing second parameters from the remote data source to the verification device;
- the remote data source is adapted, when the initiation of said process is prompted, to transmit to the verification device initial data representing a plurality of selectable options, each of said options corresponding to a respective available selection of second parameters,
- the verification device is adapted to receive said initial data and to enable selection of the selectable options by the user, and if an option is selected, to transmit to the remote data source data representing the selected option, and
- the remote data source is adapted to transfer data representing the second parameters corresponding to the selected option, from the remote data source to the verification device.

In a further preferred embodiment of the second aspect of the invention, the baggage handling verification system includes a location identifying device separate from the verification device, wherein
- the verification device is adapted to acquire location information from the location identifying device, wherein the location information is information about a location of the verification device; and the verification device is adapted to transfer data representing the location information to the remote data source to prompt the transfer of said data representing second parameters from the remote data source to the verification device with those second parameters being based on said location.

In yet a further preferred embodiment of the second aspect of the invention, the verification device has a unique identifier and is adapted to transmit data representing said unique identifier to the remote data source and to prompt the remote data source; transmission of said data representing second parameters from the remote data source to the verification device, with that data being based on unique identifier; and the remote data source is adapted on being prompted by the verification device to transmit the data representing second parameters from the remote data source to the verification device, with that data being based on the unique identifier.

According to a third aspect of the invention there is provided a method of determining whether an item of baggage, to which is fixed an RFID tag, is to be handled in accordance with predetermined parameters relating to a manner of handling baggage, wherein data contained in the tag represents first parameters for use in determining a method of handling baggage, the method including:

providing a baggage handling verification device according to the first aspect of the invention;

causing the verification device to be releasably attached to a part of the body, other than the hands, of a user of the device by the at least one device attachment element;

causing the RFID reader to read data received by the antenna from the tag, that data representing said first parameters;

allowing the CPU to compare the first parameters with second parameters for use in handling baggage, represented by data stored in the data memory to determine if there is a match between the first parameters and second parameters, whereby the user interface emits at least one first predetermined user-detectable signal if the CPU determines that there is a match between the first parameters and second parameters, and the user interface emits at least one second predetermined user-detectable signal if the CPU determines that there is no match between the first parameters and second parameters; and determining that the item of baggage is to be handled in accordance with predetermined handling parameters for handling baggage, relating to the second parameters, if the user interface emits said at least one first predetermined user-detectable signal, and that the item of baggage is not to be handled in accordance with the predetermined handling parameters if the user interface emits said at least one second predetermined user-detectable signal.

In one preferred embodiment of the invention, the baggage handling verification device is adapted to enable acquiring of the data representing second parameters from a remote data source prior to storage of that data in the data memory.

Where reference is made herein to a tag being attached to an item of baggage, this includes a case where the tag is incorporated into, or is otherwise integrally connected to, or forms an integral part of, the baggage.

Where reference is made herein to Bluetooth™ wireless transmissions of data or communications, this includes reference to wireless transmissions of data or communications having methodologies, specifications, and parameters falling within Bluetooth data transmission standards even if not certified or authorized to be referred to by the name Bluetooth.

In this specification, reference to first parameters being for use in determining a method or manner of handling baggage (or similar references having corresponding meaning), also applies, unless the context indicates otherwise, where the baggage is not to be handled according to a particular method or manner. Thus, if a determination is made using first parameters that baggage is not to be handled according to a particular method or manner, such refraining from handling baggage also constitutes a method or manner of handling baggage. The same applies mutatis mutandis to a reference to second parameters.

BRIEF DESCRIPTION OF THE DRAWINGS

Preferred embodiments of the invention will now be described, by way of example only, with reference to the accompanying drawings in which:

FIG. 1 is a schematic side view of a baggage handling verification device according to an embodiment of the invention;

FIG. 2 is a schematic perspective view of a base component of the device of FIG. 1;

FIG. 2a is a diagrammatic representation showing two possible orientations of a housing of the device of FIG. 1;

FIG. 3 is a diagrammatic view of inner components of the base component of FIG. 2 and a separate storage memory source;

FIG. 4 is a schematic side view of an item of baggage with an RFID tag attached to the item of baggage;

FIGS. 5a and 5b are two different representations on a display screen of the device of FIG. 1;

FIGS. 6a and 6b are two further different representations on a display screen of the device of FIG. 1;

FIGS. 9 to 12 are diagrammatic views of inner components of base components of baggage handling verification devices according to further, different embodiments to that of FIG. 1, with various different remote receivers and transmitters;

DETAILED DESCRIPTION

Figure 7:
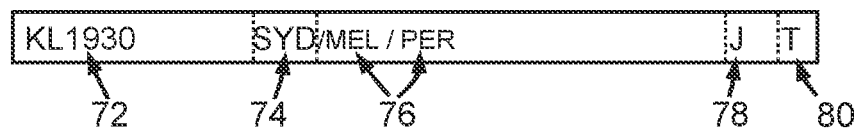
FIG. 7 is a representation of a display on the display screen of the device of FIG. 1 according to another embodiment of the invention.

Referring to the drawings there is provided a baggage handling verification device 10. The device 10 includes a base component 12 and a device attachment element 14.

The base component 12 includes a housing 16 with a display zone 18, and a clip 20 extending from the bottom of the housing.

The device attachment element 14 includes a connector component 22 and a rigid loop 24 integrally joined with the connector component, the loop defining an aperture 26.

Attached to the connector component 22, adjacent to its opposite ends, are arm straps 28. The arm straps 28, at their ends opposite the ends that are attached to the connector component 22, have releasable attachment means 30 in the form of mating parts of a hook and loop fastener (such as Velcro™).

In other embodiments (not shown), other type of releasable fasteners are used, such as buckles.

The arm straps 28 are for releasably attaching the attachment element 14 to either arm of a user of the device 10. In the preferred embodiment, the arm straps 28 are adapted for attachment to the user's forearm, just below the elbow.

As shown in FIG. 1, the clip 20 can be inserted through the aperture 26 in the loop 24 in order to releasably attach the base component 12 to the attachment element 14, and hence to the user's arm when the attachment element is attached to the user's arm by the arm straps 28.

Within the housing 16, the base component 12 includes an RFID antenna 32, RFID reader module 34, a battery 36 (preferably a rechargeable Lithium battery), a central processing unit (CPU) in the form of a micro-controller 38, a display screen 40 which is preferably an LCD screen, and storage memory 42. The display screen 40 is adapted to be aligned with the display zone 18 in the housing 16.

In another embodiment (not shown), the housing 16 is rotatable relative to the arm straps 28 and hence relative to the user's arm when the device 10 is attached to the arm, between the two positions as shown in FIG. 2a. The position shown in solid lines corresponds to that shown in FIG. 1, while the position shown in dashed lines is rotated through 90 degrees relative to the first-mentioned position. This allows the user to select the desired position of the housing 16, and hence of the display screen 40, to facilitate comfortable viewing of the screen by the user.

The manner of attachment of the housing 16 to the remainder of the device 10 in that embodiment is not shown and may be achieved in different ways. For example, the base component 12 may include the housing 16 and the clip 20, while the rigid loop 24, instead of being integrally joined to the connector component 22, may be mounted on the connector component so as to be rotatable relative thereto.

For instance, the formation constituting the rigid loop 24 may include a headed stud which projects into an aperture in the connector component 22 to allow rotation of the stud, and hence of the clip 20 which passes though the aperture 26 in the loop, and of the base component 12 as a whole—including the housing 16—relative to the connector component 22.

The device 10 further includes a wireless reader 44 for receiving wireless signals, which in the preferred embodiments described herein, are of a type compatible with, or which operate according to, Bluetooth™ standards. In other embodiments, the device and wireless reader may be adapted for use with wireless signals other than Bluetooth™ standards. However, because the applicable standard according to the preferred embodiment is a Bluetooth™ standard, the wireless reader 44 is referred to herein as the Bluetooth reader.

Programmed into the micro-controller 38 is a software application ("app") adapted to read and process the wireless signals. According to the preferred embodiment the app is adapted to read and process the wireless signals according to a Bluetooth™ standard. Hence, the app is referred to herein as the Bluetooth app.

As discussed in more detail below, according to the present embodiment, the storage memory 42 is used to store information about a particular journey undertaken or to be undertaken by passengers. For convenience, that information as stored in the storage memory 42 is referred to herein as journey information.

Examples of the types of information that may be stored in the storage memory 42 include information signifying identifiers of flights such as a flight numbers; for signifying arrival ports for flights; and for signifying work stations or baggage handling stations (such as particular baggage conveyers) at which passengers' baggage is to be loaded for the journey or journeys or following arrival at destination ports at the end of journeys.

The device 10 may be used by a user, such an airport baggage handler, to determine an appropriate action in relation to a piece of baggage 46, based on tag information stored in an RFID tag 48 attached to that piece of baggage. Thus, the journey information of the present embodiment constitutes parameters for use in determining a manner of handling the piece of baggage 46. More particularly, the device 10 may be used to determine whether an intended action by the user in relation to the piece of baggage 46 is appropriate and correct, or not. Such an intended action, which may be based on information obtained from the RFID tag 48, may include loading the piece of baggage 46 onto a particular baggage handling system, for example onto a particular conveyor belt or the like. Where reference is made herein to a conveyor or a conveyor belt, this includes reference to moving supports or tracks on which items of baggage can be loaded and which move to thereby move the baggage from one place to another, and includes a reference to baggage conveyors and carousels.

The user may affix the device 10 to his/her arm by means of the arm straps 28 and then use the device to obtain tag data from the tag 48. According to a preferred embodiment, the device 10 can be actuated by bringing it into suitable proximity to the tag 48.

According to another embodiment (not shown), the device 10 may have an actuation means such as switch or button that can be actuated by the user to actuate the device.

The device 10 is adapted, after being actuated, to receive tag data from the tag 48 by RFID transmission. Signals representing such tag data can be received by the RFID antenna 32 and read and decoded by the RFID reader 34. The received tag data (or at least a portion of that data) can then be compared, by means of the micro-controller 38, with data, representing journey information, stored in the storage memory 42.

It will be understood that the tag data from the tag 48 is to be used as parameters for determining a manner of handling the item of baggage 46. These parameters are referred to below as "first parameters". Similarly, the journey information as stored in the storage memory 42 also constitutes parameters for determining a manner of handling baggage, and is referred to below as "second parameters". While the term "parameters" is a plural term, reference herein to "first parameters" and "second parameters" includes, in each case, a reference to a single parameter except where the context indicates otherwise According to a preferred embodiment, the journey information is pre-stored in the storage memory 42 before the tag data is received from the tag 48 by the RFID antenna 32.

The journey information is captured for storage in the storage memory 42 by means of the Bluetooth reader 44. This information is obtained from a separate storage memory source 50, which may include a database, and may be referred to herein a remote data source.

In addition to the information obtained from the separate storage memory source 50, the current date is obtained from the Bluetooth app and stored in the storage memory 42.

In another embodiment (not shown), for example where the device 10 does not include the Bluetooth reader 44 and Bluetooth app, the journey information may be hardcoded into the device, or the device may be adapted for the journey information to be manually programmed into the device.

The micro-controller 38 is adapted to compare the received and read tag data (or at least a portion of it) with a corresponding type of data, and possibly other data such as data representing a current date, forming part of or stored with the journey information.

The micro-controller 38 is also preferably adapted to compare information from the device 10 itself with information included in the journey information, a primary example of which is the current date on the device and a desired baggage handling date in the journey information.

If there is a match in the compared data, the micro-controller 38 is adapted to cause the device 10 to emit a first user-detectable signal representing that there is such a match, or a second user-detectable signal representing that there is no match. While the references to the first user-detectable signal and second user-detectable signal are each in the singular, each of these references is to be taken to include a plurality of signals.

The first user-detectable signal representing that there is a match, in the preferred embodiment, includes green lighting on the display screen 40. The second user-detectable signal representing that there is not a match, in the preferred embodiment, includes red lighting on the display screen 40. In a preferred embodiment, the second user-detectable signal representing that there is not a match includes the device 10 vibrating due to a vibration inducing mechanism (not shown) included in the device.

The micro-controller 38 may be adapted to cause signals or indicia representing desired parameters of actions to be taken with the piece of baggage 46, to be presented on the display screen 40. These may include, for example, a desired destination port for the piece of baggage, the flight identifier or number of the flight on which the baggage is to be transported, whether the baggage is to be sent to the destination port directly or trans-shipped, and/or the desired priority level according to which the baggage is to be handled, such as priority handling in the case of a passenger's Business Class fare or non-priority handling in the case of a passenger's Economy Class fare.

Such parameters as shown on the display screen 40 can be used by the user, for example, to glean certain information that may be applicable in a case of a match having occurred (represented by green lighting) or information that may be the basis for a non-match having occurred (represented by red lighting).

This is illustrated with reference to FIGS. 5a and 5b, and 6a and 6b.

The scenario to which FIGS. 5a and 5b relate, involves one mode of operation of the device 10 according to an embodiment of the invention. This mode is for handling baggage at an arrival port at which baggage is received.

This mode involves saving, in the device 10, the intended destination port for the baggage to be handled, by reading the data regarding these types of information from the separate storage memory source 50, using the Bluetooth reader 44 and Bluetooth app. This information is then stored in the storage memory 42 and constitutes the journey information or part of that information. It also constitutes at least part of second parameters relating to the handling of the baggage.

In the example described with reference to FIGS. 5a and 5b, the data obtained from the separate storage memory source 50 includes data representing the destination port as the city of Sydney.

In this example, the tag data obtained from the RFID tag 48 attached to the item of baggage 46 has data representing the same destination (Sydney), and the date on which the user (baggage handler) is intended to check the tag data, which in turn represents the intended date of arrival of the baggage, that is, the current date.

Thus, according to this example, the destination port and current date contained in the tag data match the destination port and intended arrival date forming part of the journey information stored in the storage memory 42, so that there is a match between the tag data and journey information with respect to these items of information.

As there is a match, with reference to FIG. 5a, the micro-controller 38 causes green lighting to be displayed on the display screen 40 and the desired destination port of Sydney, abbreviated by the letters "SYD", to be presented on the screen as indicated at 52.

This indicates to the user that the intended action for the item of baggage 46, for example loading the baggage onto a conveyor allocated for baggage for the particular arrival (destination) port and current date, is correct. This in turn indicates to the user that he or she may proceed to load the baggage onto that conveyor.

In the embodiment described with reference to FIG. 5b, the journey information is the same as that described above with reference to FIG. 5a. However, in contrast to the example described with reference to FIG. 5a, according to the example to which FIG. 5b relates, the tag information obtained from the RFID tag 48 indicates that the destination port for the item of baggage is the city of Melbourne, as opposed to Sydney, while as in the previous example, the destination port as saved as part of the journey information is Sydney.

Thus, there is a mismatch between the tag data and journey information with respect to the destination port. As there is a mismatch, the micro-controller 38 causes red lighting to be displayed on the display screen 40, and the device 10 to vibrate. In addition, the destination port retrieved from the tag data, namely Melbourne, abbreviated by the letters "MEL" is presented on the screen 40 as indicated at 54.

The user can thus determine, from the red lighting and vibration of the device 10, that the data does not match, but also that the tag data includes the destination port of Melbourne. From this, the user can instantly determine that the reason for the mismatch is due to the tag data representing another destination port.

The user will thus be alerted by the red lighting not to take the action that was intended for the item of baggage (for example, placing it on the conveyor belt for the flight to Sydney), and will also be informed as to why the mismatch alert was generated. This may assist the user to make necessary remedial arrangements for the baggage item, for example to have it moved to another location where it is supposed to be handled.

The scenarios to which FIGS. 6a and 6b relate involve another mode of operation according to another embodiment of the invention.

This mode involves saving, in the device 10, the intended flight number for the flight (typically including a flight carrier code plus a number) on which flight the baggage is to be conveyed or has been conveyed. This information is obtained by reading the data from the separate storage memory source 50 using the Bluetooth reader 44 and Bluetooth app. This information is then stored in the storage memory 42 and is included as part of the journey information in this mode. It also constitutes at least part of second parameters relating to the handling of the baggage.

In this embodiment, other items of information stored as part of the journey information include the current date, details of the destination port, or ports if it is a multi-leg journey, in which case the baggage will be designated for being trans-shipped.

Indeed, if the baggage is to be trans-shipped, there will be multiple destination ports including the port or ports via which the baggage is to be trans-shipped and the final destination port. If the baggage is not to be trans-shipped, there will only be one destination port, being the final destination port for the baggage.

In the present example, the relevant data saved as part of the journey information regarding whether the baggage is to be handled as trans-shipped baggage reflects that it is to be so handled, and that the intermediate destination ports and final destination port are the cities of Sydney, Melbourne and Perth, respectively.

Further in this example, the tag data obtained from the RFID tag 48 attached to the item of baggage 46 has data representing the same flight number, date on which the user is intended to check the tag data (that is, the current date), that the baggage is to be trans-shipped, and the intermediate and final destination ports of Sydney, Melbourne and Perth. The tag data obtained from the RFID tag 48 also includes an indication of the level of priority with which the baggage item 46 is to be handled, for example high priority if the journey of the passenger that owns the item of baggage is Business Class, or normal (lower) priority if that journey of the passenger is Economy Class According to the example to which FIG. 6a relates as described above, these categories of information contained in the tag data (other than the priority), when compared by the micro-controller 38, match those saved in journey information stored in the storage memory 42, so that there is a match between the tag data and journey information with respect to these items of information.

As there is a match, with reference to FIG. 6a, the micro-controller 38 causes green lighting to be displayed on the display screen 40. In addition, the flight number is displayed as well as indicated at 56, together with the letter "T" as indicated at 58, indicating that the baggage is to be trans-shipped.

Also displayed are the intermediate and final destination ports of Sydney, Melbourne and Perth, abbreviated by the letters "SYD", "MEL" and "PER", as indicated at 60, 62 and 64, respectively, and the flight number as indicated at 56.

Another item displayed on the display screen 40 is the letter "J", as indicated at 65, being a code for a Business Class fare for the passenger to whom the item of baggage 46 belongs. Such information emanates from the tag data (in a manner described further below) and is not contained in the journey information as that does not pertain to specific passengers but rather provides general information regarding the journey.

The green lighting and other details on the display screen 40 indicate to the user that the intended action for the item of baggage 46, for example loading the baggage onto a conveyor allocated for baggage from the flight identified by the particular flight number on the current date, is correct. This in turn indicates to the user that he or she may proceed to load the baggage onto that conveyor.

In the embodiment described with reference to FIG. 6b, the journey information is the same as that described above with reference to FIG. 6a. However, in contrast to the example described above with reference to FIG. 6a, according to the example to which FIG. 6b relates, the tag information obtained from the RFID tag indicates that the baggage is not to be trans-shipped, that the flight number is AB1235 as opposed to AB1234 indicated in the tag data described with reference to FIG. 6a (see at 56 in FIG. 6a), and that the final destination port for the item of baggage is the city of Brisbane.

Thus, there is a mismatch between the tag data and journey information with respect to these items of information. As there is a mismatch, the micro-controller 38 causes red lighting to be displayed on the display screen 40 and causes the device 10 to vibrate. In addition, the flight number and final destination port of Brisbane retrieved from the tag data are presented on the screen 40, as indicated at 66 and 70, respectively, where the final destination, Brisbane, is indicated by the abbreviation "BNE".

The fact that tag data reflects that the baggage is not to be trans-shipped is indicated by the absence of the letter "T" as was shown in FIG. 6a.

The user can thus determine, from the red lighting, that the data does not match, but also that the tag data includes the destination port of Brisbane, from which the user can instantly determine that the reason for the mismatch is due to the tag data representing that the baggage is not to be trans-shipped and the tag data indicating the final destination of Brisbane as opposed to the intermediate and final destination ports of Sydney, Melbourne and Perth forming part of the journey information.

The user will thus be alerted by the red lighting and vibration of the device 10 not to take the action that was intended for the item of baggage (for example, placing it on the conveyor belt for the flight to Sydney), and will also be informed as to why the mismatch alert was generated. This may assist the user to make necessary remedial arrangements for the baggage item, for example to have it moved to another location where it is supposed to be handled.

Data captured by the device 10 from the RFID tag 48 may be sent, for example by means of Bluetooth™ transmission, to a suitable receiver at the port at which the baggage is being handled, in order for that data to be used to update that port and/or the airline in relation to which the baggage handling is taking place, of the updated location of the baggage.

The following examples describe ways in which data received from an RFID tag 48 is analyzed and filtered for the purpose of the micro-controller 38 comparing the data with the journey information.

Process for Coding and Decoding Flight Data on the Tag

In this example, a flight code that is to be stored in the tag 48, in ASCII characters, is: KL1930220AMSC.

That code, in binary, is as follows, where the code is shown in 8-bit bytes in a column:

01001011
01001100
00110001
00111001

00110011
00110000
00110010
00110010
00110000
01000001
01001101
01010011
01000011.

Example of Compacting the Code for Storage on the Tag

This code has 104 bits. It can be compacted by deleting the two leading bits from each byte, as follows:
001011
001100
110001
111001
110011
110000
110010
110010
110000
000001
000011.

This leaves 78 bits. However, to be stored on the tag 48, the string of binary code is to constitute ten full 8-bit bytes. In order for the string to have 80 bits to constitute those ten 8-bit bytes, the string can be padded with two 0's at the end, as follows (where the padding 0's are shown in bold):
0010110011001100011110011001111000011001011001011000000000100110101001100001100.

These ten 8-bit bytes constituted by this string and padded 0's is shown in its separate bytes in a column, as follows:
00101100
11001100
01111001
11001111
00001100
10110010
11000000
00010011
01010011
00001100

This is the 10-byte binary string encoded into the tag 48 to represent the desired ASCII code of the flight data.

Decoding of the Data Stored on the Tag

To decode the data stored on the tag 48, the reverse of the above compaction technique may be applied as described below.

The 10-byte binary string encoded into the tag 48 is retrieved. It is shown linearly as follows:
00101100110011000111100110011110000110010110010110000000001001101010011000001100.

The string is then divided into chunks of six bits, resulting in 13 whole chunks, and two leftover bits (the padding 0's). This is shown in a column as follows:
001100
110001
111001
110011
110000
110010
110010
110000
000001
001101
010011
000011
00.

The two leftover padding bits (0's) are discarded.

The original two bits that were stripped from the front of each of these chunks during compaction as discussed above are now re-added to the front of those chunks.

The rule applied in re-adding those bits is described below.

If the most significant byte (MSB) of a particular chunk is "0", concatenate "01" as a prefix to the chunk. If the MSB of a particular chunk is "1", concatenate "00" as a prefix to the chunk. The result of this process is as follows where the chunks with their concatenated prefixes, are as shown in a column as follows:
01001011
01001100
00110001
00111001
00110011
00110000
00110010
00110010
00110000
01000001
01001101

The above 13 8-bit bytes constitute the original 104-bit binary code representing the ASCII flight data. This string can be re-converted to ASCII characters as follows: KL1930220AMSC.

Storage of the Compacted Code and Other Information in the Tag

The compacted binary code (prior adding back the leading characters above, and prior to discarding the two padding 0's) is stored on the tag 48 in that binary format together with other information. The significance and usage of some of that other information may be considered in terms of the Hexadecimal representation of that information and of the above compacted code, as the manner in which that code is processed is based on the Hexadecimal representation.

Indeed, the tag 48 includes data representing 42 bytes of Hexadecimal information. Of those 42 bytes, while the 10 MSBs of tag code constitute a Permanent Baggage Tag (PBT) Number, the 12 LSBs of tag code constitute (in Hexadecimal format) the combination of the above-mentioned additional information and of the above-mentioned 104-bit binary code (which in turn represents the above ASCII flight code).

The Hexadecimal representation of that additional information together with the compacted version of the original 104-bit binary code in Hexadecimal format is as follows: 460A2CCC79CF0CB2C013530C.

In this string, the additional information is constituted by the two MSBs, namely 46 and 0A, where:
  46 is International Air Transport Association (IATA) Hexadecimal code for flight data, and
  0A is the Hexadecimal equivalent of the decimal number 10, indicating that following ten bytes represent the flight data.

Thus, when the relevant binary data representing that Hex string is read by the RFID reader 34 from the tag 48 and converted into, and considered in, its Hexadecimal format, it informs the device 10 firstly that the data being read includes the appropriate IATA code for flight data, and therefore that the flight data in that code may be treated as proper flight date.

Secondly, it informs the reader 34 that the flight data is constituted by the next ten bytes of Hex code.

Thus, of the above Hex string, the Hexadecimal representation of the flight data as compacted and stored in the tag 48 (following the two MSBs) is as follows: 2CCC79CF0CB2C013530C.

Analysis of the ASCII Flight Data

In the above examples, the ASCII character flight data stored in compacted form in binary format on the tag 48, and which is derived from the above decoding process, is "KL1930220AMSC". The portions of that string are explained as follows:

KL is carrier code 1930 is flight number 220 denotes the day of the year using annual Julian-type dates calculated from the beginning of the particular year so that 220 represents the 8th August as it is the $220^{th}$ day of the year on a non-leap-year year.

The next 3 characters represent the destination city name using international airport codes. Thus, those 3 characters, "AMS" represent Amsterdam.

The last character represents the travel class. The characters used by different airlines to denote flight classes may differ. In this present example, the letter "C" is used. In other examples used herein (see below), the letter "J" is used to denote Business Class, while the letter "Y" is used to denote Economy Class.

If multiple flights are involved, that is, in a situation where baggage is to be handled on a trans-shipped basis, with a maximum of three possible flight legs, then the same string format as the raw hex string above will be repeated for each flight in addition to the first, and concatenated to the end of that first string in the case of two flights, or to the already-concatenated string in the case of three flights.

Each one of the concatenated strings will include data which, when analyzed as discussed above, will represent the three-character airport code for the particular destination to which that string relates.

Hence, of the fully concatenated string, the relevant twelve LSBs will represent the final destination, the next twelve relevant bytes (if starting with the Hex digits 460A—where, as discussed above, "46" represents the IATA code for flight data and "0A" indicates that the following 10 bytes represent flight data) will represent the first connecting destination if there are a total of two destinations or the second connecting destination if there are a total of three destinations. If there are a total of three destinations, there will be a next string of twelve bytes which (again, if starting with the Hex digits 460A) will represent the first connecting destination.

Of the string converted to ASCII characters, the digits representing the carrier code and flight number (collectively, the first six characters) together with the destination port (city) and class (collectively, the last four characters) are stored as a string in a list, which, in the present example is titled "FlightList". Reference to "FlightList" below is a reference to that list.

Thus, of the above string converted to ASCII characters, the new string created in this manner will be "KL1930AMSC", referred to below as the "flight data string".

FlightList will be three entries long (with sequential positions identified as positions 0, 1 and 2) and will be populated in order from the third entry to the first entry. For example, the final destination will be stored at the third entry position, 2, with the first and second positions, 0 and 1, being optional. Thus, where it is a one-leg journey, the third position in the list will be populated, with the other two positions remaining empty. If is it is a three-leg journey, the other two positions will be populated with the relevant data for those legs of the overall journey.

When baggage (for example the item of baggage 46) is being handled at a particular port, the micro-controller 38 will compare the current port as stored as part of the journey information in the storage memory 42, with the destination port as represented by the 7th to 9th characters of the flight data string under consideration (which in the above example are "AMS", representing the city of Amsterdam). The current port as stored as part of the journey information, which would have been obtained from the separate storage memory source 50 should, of course, be the port at which the baggage handling is taking place.

This comparison process will start with the third position (position 2) in FlightList. If no match is found in relation to destination port, the comparison process will move to the second position in FlightList (position 1), and if no match is found there, will move to the first position FlightList (position 0).

The process of comparing and moving to the second or first positions will continue until a match or null is found, where null is where there is no data at the relevant position, that is, an empty string.

If a match or null is found in a flight data string at any position other than the first position (0), then that flight data string and all the entries (if any) at lower-numbered positions relative to the position of that flight data string, are deleted.

The above may be illustrated by the following examples pertaining to three-leg journey.

Example 1

In this example, the above comparison process is carried out at the first destination port of the journey. Thus, it is likely that a match will be found at the first position in FlightList, namely position 0.

Once the comparison indicates a match for that string for the particular destination port, the string in FlightList list containing the identifier for that port (in the present example, position 0) is no longer required, as the discovered match will trigger the process for causing the device 10 to indicate to the user that the match has been found (as discussed further below), and that string is deleted.

The remaining strings in FlightList will be those at the second and third position, namely positions 1 and 2, signifying the second and final destination ports.

Example 2

In this example, the above comparison process is carried out at the second destination port of the journey. Thus, it is likely that a match will be found at the second position in FlightList, namely position 1.

Once the comparison indicates a match for that port, the string in FlightList containing the identifier for that port (in the present example, at position 1) is no longer required, as the discovered match will trigger the process for causing the device 10 to indicate to the user that the match has been found (as discussed further below), and that string is deleted.

In addition, in the present example, the string at the first position in FlightList list, namely position 0, if not already deleted, will no longer be needed as that relates to a previous leg (port) of the journey. Therefore, that string, if not already deleted, is now deleted.

The only remaining string in FlightList will be that at the third position, position 2, signifying the final destination port.

Following the above process, FlightList shows all upcoming flight destinations in a sequenced order if there is more than one. The first flight destination found in the FlightList (in order from the first to third entries—namely positions 0, 1 and 2) will be the next destination port.

Output to the Device

The process of constructing the output of the device 10, to be displayed on the display screen 40, is set out below, where, in the preferred embodiment, the output is represented on the display as a single row of characters as illustrated in FIG. 7. This output is derived from the flight data strings in FlightList.

From the next sequential flight data string in FlightList, the next destination port's flight carrier code and flight number (e.g. KL1930) are determined from the first six characters of that string. This is stored as a variable, "NextFlightNum", on the device 10, and can be suitably formatted for display (for example in terms of the font to be used, color of presentation, and so on). Such a display is indicated at 72 in FIG. 7.

The 7th to 9th characters (three characters in total) are then read from the flight data string relating to the next destination port and are stored as a variable, "NextDestination", on the device 10. For example, if the next destination port is the city of Sydney ("SYD"), then the "NextDestination" is saved as "SYD" for display on the display screen 40 as indicated at 74 in FIG. 7.

If there is one further flight data string in FlightList, indicative of one further destination port in the multi-leg journey, the 7th to 9th characters of that string are saved as a variable, "Future Destinations" on the device 10.

If there is more than one further flight data string, indicative of more than one further destination port in the multi-leg journey, the 7th to 9th characters of each of those remaining flight data strings in FlightList are concatenated, in sequential order, and saved as a single string as the variable "FutureDestinations" on the device 10.

For example, if there is one remaining flight data string in FlightList (indicating that there is one further destination port in the journey), and if that port is the city of Melbourne ("MEL"), the part of the remaining flight data string representing that port can be saved as the variable "FutureDestinations" in the following format: "/MEL".

If there is are two remaining flight data strings in FlightList (indicating that there are two further destination ports in the journey), and if those ports are the cities of Melbourne ("MEL") and Perth ("PER"), the parts of the respective flight data strings in FlightList representing those two ports can be saved as the "FutureDestinations" variable in the following format: "/SYD/MEL". This may be displayed on the display as indicated at 76 in FIG. 7.

The last character in the flight data string for the next port, following the three characters representing the location at which the baggage handing is taking place (i.e. the current port), is stored in a variable called "TravelClass", for example as "J" indicative of Business Class and "Y" indicative of Economy Class. This may be displayed on the display as indicated at 78 in FIG. 7.

If there are multiple flight data strings in FlightList, indicating multiple remaining destination ports in the journey, then a variable, "IsTransit" is set to True. If IsTransit is set to True, then the letter "T" (for transit) will be displayed at the end of the row, as indicated at 80 in FIG. 7.

The names of the above variables are provided by way of example only.

An advantage of the present invention as described above is that the device 10 is attached to the user's arm in a way that keeps the user's hands free, for example to handle baggage. The user may thus be able to avoid the inconvenience of having to move the baggage to a pre-installed, stationary reader for reading the RFID tag, or to have to pick up a separate reader from a support such as a cradle or the like, for reading the RFID tag after which such reader would have to be returned to the support.

A further advantage is that, in one preferred embodiment, components of the device 10 such as the RFID reader module 34, micro-controller 38, display screen 40 and wireless reader 44 are all part of one integrated unit. This can also assist in reducing inconvenience to the user that might otherwise occur if the user were required to use more than one device to read the baggage tag and have appropriate signals provided to the user, such as colored lighting and indicia such as items of text. Such a scenario might occur, for example, if the user were required to use a separate reader to read the RFID tag, and have the signal or signals generated on yet a further separate device such as a mobile phone.

Figure 8:
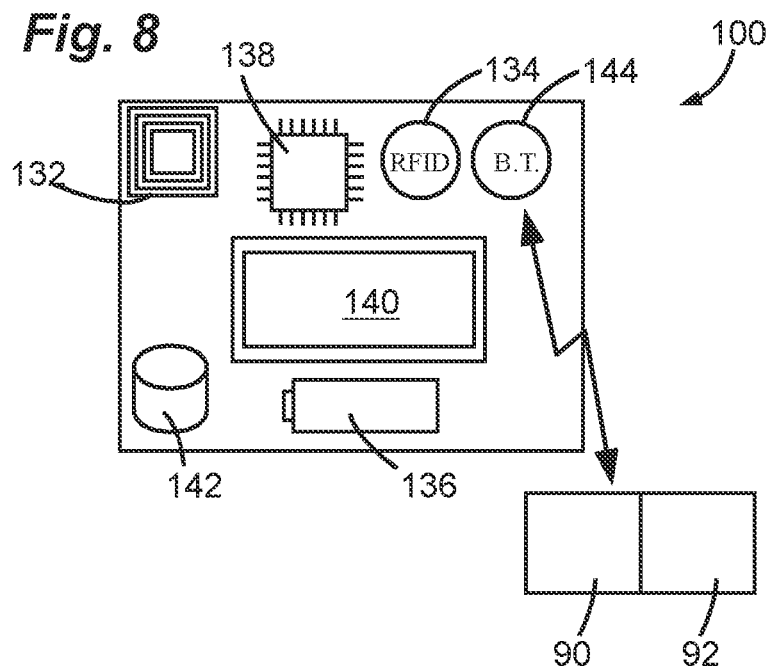
FIG. 8 is a diagrammatic view of inner components of the base component of a baggage handling verification device according to a different embodiment to that of FIG. 1, together with a remote receiver and transmitter.

According to another aspect of the invention, there is provided a device 100 shown diagrammatically in dashed lines in FIG. 8. The device 100 has similar components to the device 10 as described above (not all of the components being shown), except for differences as follows. Components described in relation to the device 10 that are present in the device 100 are referred to by the same reference numerals as in the device 10, except for the prefix "1".

The device 100 has a wireless reader 144 which also serves as a wireless transmitter and is adapted not only for receiving wireless signals from a remote wireless transmitter 90 but for transmitting wireless signals to a remote wireless receiver 92. Hence, the wireless reader 144 is referred to below as a wireless reader/transmitter.

The remote wireless transmitter 90 and remote wireless receiver 92 may form part of a single wireless transmitter and receiver.

In use, the RFID device 100 is adapted to read data from the baggage tag 48 containing a unique identifier of the tag. The wireless reader/transmitter 144 then sends data representing that identifier to the remote receiver 92.

The wireless reader/transmitter 144 then receives a response signal from the remote transmitter 90.

The micro-controller 138 of the device 100 then generates at least one user detectable signal based on the content of the response signal from the remote transmitter 90.

This functionality is useful not only for the purpose of verifying and comparing data on the tag 48 with data in the journey information as in the case of the device 10, but for alerting the user of the device 100 to situations or facts as reflected in the response signal from the remote transmitter 90.

As in the case of the device 100, the user detectable signals caused by the micro-controller 38 to be generated by the device may include color lighting generated on the display screen 140, indicia such as text and words, and vibration.

An example of such use is where a particular passenger's baggage has been assigned for being loaded onto an airplane or has already been loaded, but for some reason the passenger is not and will not be present on the flight. In such a case it may be desirable for the passenger's baggage to be removed and returned to the passenger or held for return to the passenger.

When a user wearing the device 100 is in proximity to the RFID tag 48 on that passenger's baggage, the RFID reader 134 will be activated by such proximity and retrieve data from the tag, the data including the tag's unique identifier.

The wireless reader/transmitter 144 will then transmit data representing that identifier to the remote receiver 92.

The remote receiver 92 and transmitter 90 form part of a data handling system (not shown—for example of an airport or airline) and may be pre-programmed or pre-loaded with data pertaining to that tag. In the present example, that data reflects the situation that the passenger will not be on the flight. That system will then cause the remote transmitter 90 to send a predetermined signal or signal type for reflecting that situation.

When the wireless reader/transmitter 144 receives the signal from the remote transmitter 92, the micro-controller 38 is adapted to cause the device 100 to generate the appropriate user-detectable signals, which are selected from a plurality of predetermined signals, based on the particular situation represented by the signal from the remote transmitter. For example, for the particular situation described, the detectable signals include purple lighting on the display 140 and vibration of the device 100.

In a preferred embodiment, a single device (not shown) includes the componentry of the devices 10 and 100 as described above, and such device is thus adapted to perform the functionalities of those devices 10 and 100 as described.

According to yet a further embodiment of the invention, there is provided a verification device generally referenced 200, of which specific embodiments are discussed below. The verification device 200 has similar components to the device 10 as described above, except for differences as discussed below. Components described in relation to the device 10 that are present in the verification device 200 are referred to by the same reference numerals as in the device 10, except for the addition of the prefix "2".

While the device 10 as described previously is adapted for journey information to be stored in the storage memory 42, the verification device 200 is adapted for storing, in its storage memory 242, parameters for use in determining a manner of handling a piece of baggage, where the parameters are not limited to journey information relating directly to a particular journey that has been undertaken or that is to be undertaken by passengers. Rather, those parameters ("second parameters" as referred to above) may include other types of information which, while constituting such parameters, do not relate directly to a particular journey undertaken or to be undertaken.

The verification device 200 is adapted for second parameters to be acquired from a remote data source by wireless or wired transmission, depending on the specific embodiment.

The second parameters may, for example, be parameters for use in determining a method of handling baggage where that information does not relate directly to journey information, but relates indirectly to journey information. For example, the second parameters may relate to the placing of baggage, for example by being used to determine that specific items of baggage are to be placed on a certain airport baggage conveyor, where that conveyor is to be used for conveying baggage which is from, or which is to be carried on, a particular flight.

In the sense that the particular conveyor is to be used for conveying baggage from, or to be carried on, a particular flight, that conveyor relates to specific journey information—such as information pertaining to that particular flight. For example, if the particular conveyor is to be used for conveying baggage from a particular numbered flight, the conveyor will relate to specific flight information including the flight number. However, the second parameters for use in determining a manner of handling that baggage in this example make no direct reference to that flight (including to its flight number). For instance, they might refer only to other information such as bag identifiers of items of baggage that are to be travelling on that flight or that have arrived on that flight. In such cases, the second parameters may be regarded as only relating indirectly to that fight (as the conveyor is used for baggage from or for that flight), and hence indirectly to journey information.

According to another example, the second parameters do not relate to any specific passenger journey and therefore do not relate to journey information at all. In this example, the second parameters may be used in determining a method of handling various different items of baggage independent of the journey, if any, undertaken or to be undertaken by passengers to whom that baggage belongs, or by the items of baggage themselves. For example, the second parameters may relate to the moving of baggage from one location at an airport to another, for safety or security reasons, logistical reasons, streamlining or efficiency reasons, and so on.

Similarly to the micro-controller 38 of the device 10, the micro-controller 238 of the device 200 is adapted to compare first parameters received from tags 48 attached to items of baggage 46 with second parameters that have been received from a remote data source and stored in the storage memory 242 of the verification device 200.

If there is a match in the compared first and second parameters, the micro-controller 238 is adapted to cause the device 200 to emit a first user-detectable signal representing that there is such a match, or a second user-detectable signal representing that there is no match. This feature according to the present embodiment of the invention is mutatis mutandis as described with reference to the embodiments of the invention pertaining to the device 10.

In addition, according to one form of the present embodiment, once data from an RFID tag 48 attached to an item of baggage 46 is read by the RFID reader module 234 of the verification device 200, the micro-controller 238 is adapted to cause signals or indicia to be presented on the display screen 240 of the verification device, where these signals or indicia represent parameters or elements of desired methods of handling the item of baggage, including, where appropriate, actions to be taken with that item of baggage.

The verification device 200 is configured to enable the acquiring of the data representing the second parameters from the remote data source for storage in the storage memory 242 of the verification device, only if an operational criterion is met, or more than one operational criteria are met.

In this specification, the operational criteria are referred to in plural, but this includes a reference to a single operational criterion unless the context indicates otherwise.

Four different operational criteria applicable to different sub-embodiments of the device 200 are described below where the device according to those four embodiments is indicated, respectively, by reference numbers 200.1, 200.2, 200.3 and 200.4.

Verification Device 200.1—Adapted for Use with a Companion Device

Figure 9:
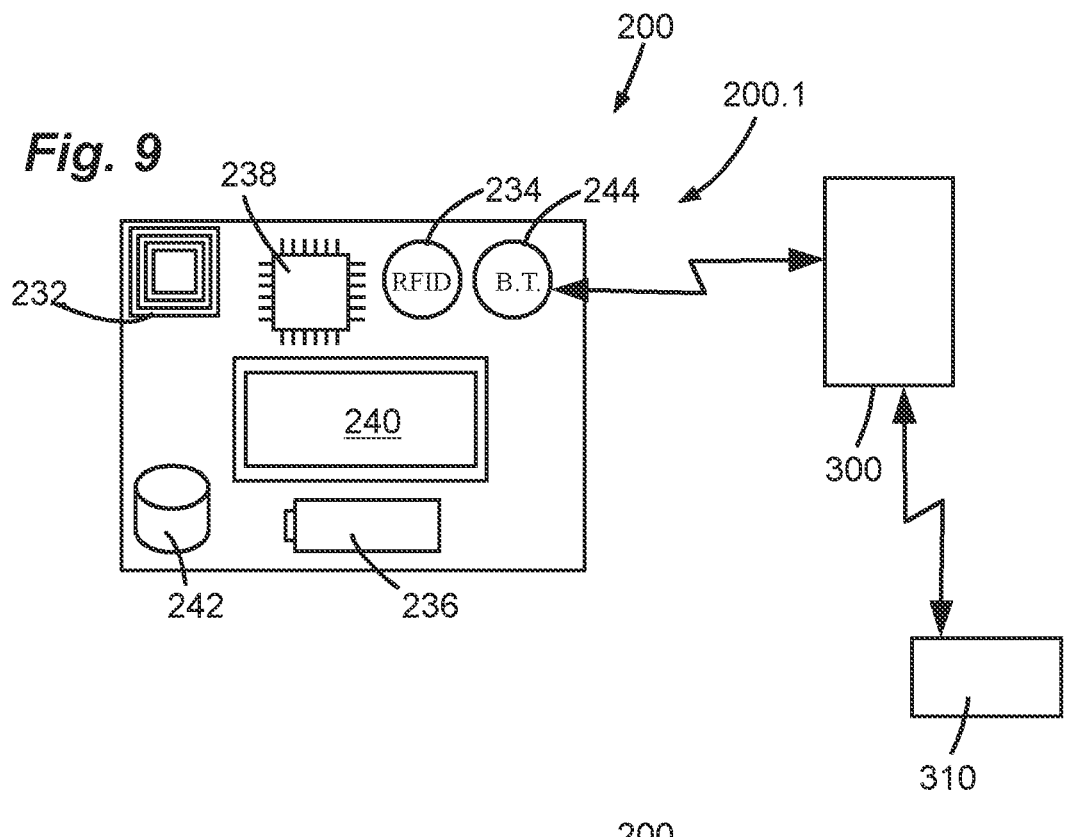

The embodiment 200.1 of the verification device 200 is illustrated in FIG. 9. The operational criteria for this embodiment include that the verification device 200.1 is adapted to be connected with a remote data source in the form of an electronic, data handling, companion device 300. The operational criteria for this embodiment include that the verification device 200.1 is adapted to be suitably connected to the companion device 300 to enable the transfer of electronic data between the verification device and the companion device when the verification device is in such proximity to the companion device that a user using the verification device by hand can simultaneously, by hand, operate the companion device 300. This can thereby enable the user to directly operate the companion device 300 to cause data representing second parameters to be transferred to the verification device 200.1 from the companion device. This can occur while the user is holding the verification device.

The verification device 200.1 is adapted to communicate via Bluetooth™ with the companion device 300.

The companion device 300, according to the preferred form of the present embodiment, is a mobile (smart) phone with a software application (app) installed on it to enable it to function as required in relation to the verification device 200.1. In other embodiments, the companion device 300 is in other forms, for example a device dedicated to the functionality of the companion device.

A potential benefit of the verification device 200.1 being adapted for use with the companion device 300 includes that there is no need for the verification device to be able to acquire data representing the second parameters from a remote data source, for example where the remote data source is out of wireless transmission range (including Bluetooth™ range where relevant) from the verification device at a particular time of use.

On the other hand, the companion device 300, according to this form of the present embodiment, is adapted to store the data representing the second parameters before this data is transmitted to the verification device 200.1. The companion device 300 may be adapted to have that data wirelessly transmitted to it from a remote data source 310, preferably by Bluetooth™ transmission (for example, when the companion device is in sufficient proximity of the remote data source to enable this), or may have that data downloaded to it via a wired connection from the remote data source. The data is then stored in memory of the companion device 300.

For the purpose of distinguishing between the companion device 300 as a remote data source relative to the verification device 200.1, and the data source 310 as a remote data source relative to the companion device 300, the companion device may be referred to or regarded herein as a first remote data source and the data source 310 as a second remote data source.

According to a form of the present embodiment, the companion device 300 is adapted to enable specific selections to be made on the companion device itself, of baggage handling options or options that may be used in determining ways of handling baggage, as transmitted from the remote data source 310.

To enable the options to be made available for selection on the companion device 300, according to one form of the present embodiment, the companion device 300 is adapted to prompt the remote data source 310 to initiate a data obtaining process for transferring data representing second parameters from the remote data source to the verification device 200.1.

According to a form of the present embodiment, the prompting of the remote data source 310 by the verification device 200.1 prompts the initiation of the data obtaining process.

As part of this data obtaining process, once the verification device 200.1 prompts the remote data source 310 as described above, initial data is transmitted from the remote data source 310 to the companion device 300, such data representing a number of different baggage handling options or different options that may be used in determining ways of handling baggage. In this case, the relevant options are listed on a display screen of the companion device 300, and the companion device is adapted to enable the user to select any one of the displayed options.

For example, according to a form of this embodiment, the companion device 300 may be provided with means (not shown) for scrolling though the available options and selecting the desired option (the buttons not being shown). For example, if the companion device 300 is in the form of a mobile smart phone, these means may be buttons and selectors forming part of a touch screen of the smart phone.

When the user selects the desired option on the companion device 300 as part of the data obtaining process, data is sent from the companion device 300 to the remote data source 310 to indicate which particular option has been selected by means of the selection made by the user. As a further stage of the data obtaining process, the remote data source 310 is adapted to then send data representing second parameters in accordance with the selection made, to the companion device 300.

Then, as the final stage of the data obtaining process, the companion device 300 transfers the data representing the second parameters in accordance with the selection made, to the verification device 200.1. Thus, in this form of the present embodiment, there is no requirement for the verification device 200.1 itself to have the types of interfaces that may be required for such options to be presented or such selections to be made, such as touch screens, complex keypads, and the like. This allows the verification device 200.1 to be of a simpler nature than would be required if, for example, the options were to be displayed on the verification device itself and if the selections were to be made on that device.

According to a form of the present embodiment of the invention, the verification device 200.1 and companion device 300 are adapted so that, when they are both in an activated state and in Bluetooth™ transmission range from each other, as part of the data obtaining process in relation to the present embodiment, the selectable options will automatically be presented on a display of the companion device, for selection by the user of the verification device and companion device.

According to a particular example of use, one of the options displayed on the companion device 300 (on a display screen thereof) is for loading baggage for flight no. "ABC" onto a particular baggage conveyor. The programming of the companion device 300 (for example in the form of an app) allows the user to select that option whereafter, in accordance with the above-mentioned process, the companion device 300 will transfer the data constituting the relevant second parameters to the verification device 200.1 via Bluetooth™ transmission.

In accordance with the operational criteria applicable to the present embodiment, the user will be able to hold the companion device 300 and the verification device 200.1 at the same time (say one in each hand). While doing so, the user may perform the required selection and transmission operations on the companion device 300 to cause it to send the relevant data to the verification device 200.1, and contemporaneously confirm receipt of the relevant data by the verification device.

The data sent from the companion device 300 to the verification device 200.1 need not be all of the data stored on the companion device 300 relating to the desired baggage handling operation, but might be only that part of the information required to be used by the verification device 200.1 or the user of that device. Alternatively, the data stored by the companion device 300 might be only that which is required to be used by the verification device 200.1 and the user thereof, in which case all of the information relating to the particular baggage handling operation or to be used in determining the particular baggage handling operation, may be transmitted from the companion device 300 to the verification device 200.1.

Examples of the types of information that may be transmitted include flight numbers, baggage conveyor identifiers, identification numbers of tags attached to items of baggage, and so on.

In other forms of the present embodiment, the companion device 300 might not be in the form of a mobile phone device but may be in other forms, suitably adapted or configured for the required functionality, such as providing the relevant displays, selection capabilities, data transmission capabilities, data acquiring capabilities for obtaining required data from the remote data source 310, and so on, and may be suitably programmed for these actions, whether by hard-coding, downloaded app, or manual programming.

In addition, according to other forms of the present embodiment, the verification device 200.1 and companion device 300 may be adapted to enable transmission of data from the companion device to the verification device via a wired or electrical connection.

In addition, in other forms of the present embodiment, the companion device 300 is not limited to having to display a plurality of options for selection by the user, but may instead be adapted to display only one item to be selected by the user. In other forms of the present embodiment, the verification device 200.1 and companion device 300 are adapted for the companion device to automatically transmit the required data to the verification device, for example when the two devices come within a certain range from each other, such as Bluetooth™ transmission range, or another range such as a distance of or about, say, 2 feet (0.67 meters).

Once the data constituting the second parameters is transferred from the companion device 300 to the verification device 200.1, the verification device can perform its comparison function as discussed above.

In particular, a user can use the verification device 200.1 for each item of baggage 46 that the user wishes to handle in accordance with baggage handling parameters (i.e. a manner of handling baggage) that can be determined by use of the second parameters. These second parameters are represented by data acquired from the companion device 300 and which is stored in the storage memory 242 of the verification device 200.1. The user can use the verification device 200.1 to read data from the baggage tag 48 attached to that item of baggage 46 by means of the RFID scanner 234, where that data represents the first parameters applicable to that baggage item.

The micro-controller 238 of the verification device 200.1 can then carry out a comparison between those first parameters and second parameters.

According to the present embodiment, as in the case of the embodiments described above with reference to the device 10, the display screen 240 of the verification device 200.1 is adapted to display green lighting and possibly other details to indicate to the user that there is a match between the first parameters represented by data read from the tag 48 attached to an item of baggage 46 and the second parameters represented by data retrieved from the data storage memory 242.

Given that the first and second parameters are both parameters for use in determining a manner of handling baggage, the green lighting may also constitute an indication that a method of handling baggage that is determined by use of the first parameters (that is, the parameters represented by data from the tag 48 of each item of baggage 46), and a method of handling baggage that is determined by use of the second parameters, are the same. This, in turn, will indicate to the user to proceed with the method of handling baggage determined by use of the second parameters.

The display screen 240 of the verification device 200.1 is also adapted to display red lighting, possibly together with other details, to indicate to the user that there is no match between the first parameters represented by data read from the tag 48 attached to an item of baggage 46 and the second parameters represented by data stored in and retrieved from the data storage memory 242.

Again, as the first and second parameters are both parameters for use in determining a manner of handling baggage, the red lighting, and other details if any, may constitute an indication that a method of handling baggage that may be determined by use of the first parameters and the method of handling baggage determined by use of the second parameters, are not the same. This, in turn, will indicate to the user not to proceed with the method of handling baggage determined by use of the second parameters.

In addition in this case, the other details, if any, presented on the display screen 240 of the verification device 200.1, may indicate to the user what alternative steps are to be taken instead of handling baggage determined by use of the second parameters.

Verification Device 200.2—Adapted to Query a Remote Data Source

Figure 10:
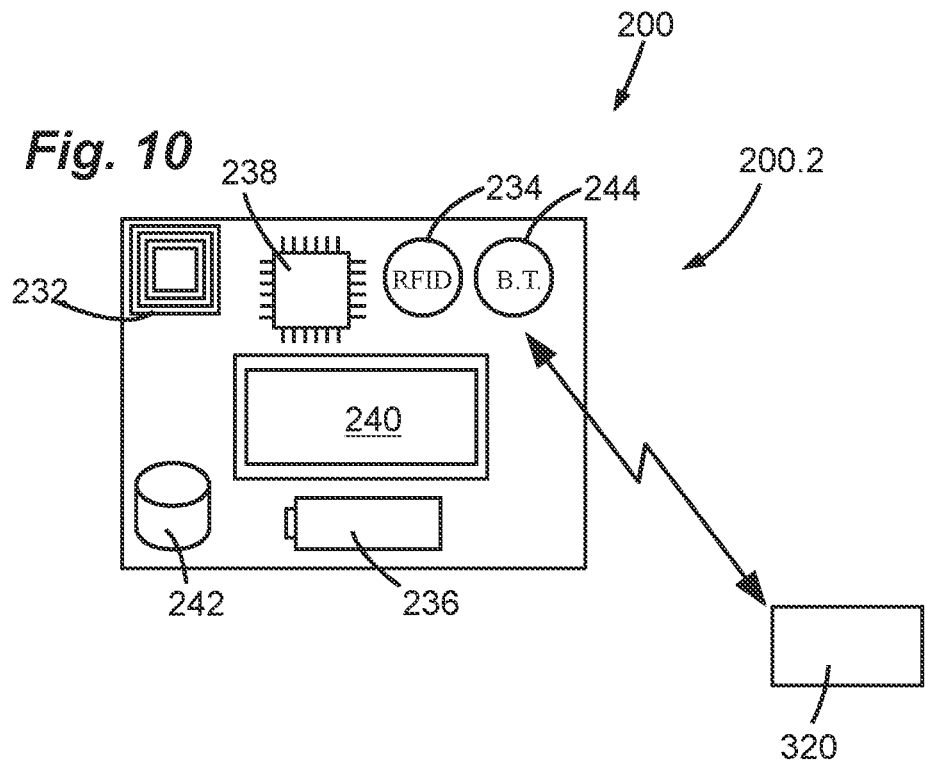

The embodiment 200.2 of the verification device 200 is illustrated in FIG. 10. In this embodiment, the operational criteria include that the verification device 200.2 is adapted prompt the remote data source 320 to initiate a data obtaining process for transferring data representing second parameters from the remote data source to the verification device 200.2.

The prompting action and the transfer of data representing second parameters from the remote data source 320 to the verification device 200.2 preferably involve wireless transmissions between the verification device and remote data source. However, in other embodiments, one or both of these actions may be via wired communications and hence via wired connections between the remote data source 320 and verification device 200.2.

According to a form of the present embodiment, the prompting of the remote data source 320 by the verification device 200.2 prompts the initiation of the data obtaining process for this form of the present embodiment.

As part of this data obtaining process, once the verification device 200.2 prompts the remote data source 320 as described above, initial data is transmitted from the remote data source 320 to the verification device 200.2, such data representing a number of different options relating to baggage handling or that may be used in determining ways of handling baggage. In this case, the relevant options are listed on the display screen 240 of the verification device 200.2, and the device is adapted to enable the user to select any one of the displayed options.

For example, according to a form of this embodiment, the verification device 200.2 may be provided with "up" and "down" buttons to scroll through the options listed on the display screen 240 and a "select" button for selecting the desired option (the buttons not being shown).

According to one form of this embodiment, the display screen 240 is a touch screen, with the buttons being part of the screen. In another form of this embodiment, these buttons are mechanical or electronic buttons separate from the display screen.

When the user selects the desired option on the verification device 200.2, as part of the data obtaining process according to the present embodiment, data is sent from the verification device 200.2 to the remote data source 320 to indicate which particular option has been selected by means of the selection made by the user. As a final stage of the data obtaining process, the remote data source 320 is adapted to then send data representing second parameters in accordance with the selection made, to the verification device 200.2.

In another form of the present embodiment, instead of the user being presented with a number of selectable options, only data representing one set of second parameters pertaining to a particular method of handling baggage, is transmitted from the remote data source 320 to the verification device 200.2.

A comparison function can then be carried out by the micro-controller 238 of the verification device 200.2, mutatis mutandis as described above with reference to the verification device 200.1. This comparison is in relation to first parameters represented by data read from RFID tags 48 attached to items of baggage 46, and the second parameters that are stored in and retrieved from the storage memory 242, and is to determine whether or not the user is to proceed with baggage handling parameters (i.e. a method of handling baggage) determined by use of the second parameters, these second parameters having been stored in and retrieved from the storage memory 242. Also as described above in relation to the verification device 200.1, the comparison function may indicate what other steps, if any, are to be taken based on other details presented on the display screen 240 of the verification device 200.2.

Verification Device 200.3—to be Used with Location Specific Information

The embodiment 200.3 of the device 200 is illustrated in FIG. 11. In this embodiment, the operational criteria include that the verification device 200.3 is adapted to store data representing location information, being information pertaining to the location of the verification device. This location may, for example, be within a particular establishment such as an airport building.

Also forming part of the operational criteria is that the verification device 200.3 is adapted to transfer data representing the location information to a remote data source 330, in order to prompt the transfer of data representing second parameters from the remote data source to the verification device, where the particular second parameters are based on the location of the verification device.

According to one preferred form of this embodiment, the verification device 200.3 is adapted to obtain the data representing the location information wirelessly, from a location identifying device 332, referred to herein as a beacon. In another form of the present embodiment (not shown), the verification device 200.3 is adapted for the data representing the location information to be manually input to the verification device by a user of the device.

According to preferred forms of the present embodiment, the verification device 200.3 is adapted to acquire the location information from the beacon 332 by Bluetooth™ transmission or using RFID, although other forms of wireless transmission may be used as well, in other forms of the present embodiment.

According to a preferred form of the present embodiment, the beacon 332 is located within a particular establishment in which the verification device 200.3 is being used, such as an airport building, and stores data representing a particular location within that establishment at which the beacon is located.

According to that form of the embodiment, the location of the beacon 332 is identified relative to the establishment. Other beacons (not shown) located at other locations in the establishment may be provided as well for identifying those locations in the same manner as with the beacon 332.

The verification device 200.3 may be adapted to acquire the location data from the beacon 332 automatically when the verification device moves into sufficient proximity to the beacon, for example Bluetooth™ transmission proximity, and triggers the beacon to transmit the location data. In this case, it will be understood that while the verification device 200.3 may be very close to the beacon, it is not at exactly the same position as the beacon. Nevertheless, the location data will still represent the general location of the verification device 200.3, for example at or adjacent to a particular baggage conveyor, and therefore the location of the beacon 332 is to be taken herein to be the location of the verification device 200.3.

According to another form of the present embodiment, the verification device 200.3 is adapted to prompt the transmission of the location data from the beacon 332 to the verification device by means of a suitable actuation of the verification device by the user.

The location data that is acquired by the verification device 200.3 from the beacon 332 may, for example, include a number or code that identifies the particular beacon within the establishment.

The verification device 200.3 is adapted to transmit to the remote data source 330 the location data and the remote data source is adapted to identify the location of the beacon 332 and hence of the verification device and transmit to the verification device date representing second parameters based on that location.

According to a specific example, the identifier code of the beacon is "000AB". A database forming part of, or connected to, the remote data source 330 may contain information linking codes for various beacons in the establishment with particular locations within the establishment. Thus, according to the present example, the beacon code "000AB" is linked to a particular baggage conveyor at a particular airport. The remote data source 330 will thus be able to determine that the beacon with that code, and hence the verification device 200.3 from which that code is transmitted to the remote data source 330, are located at or adjacent to that baggage conveyor. It will thus be understood that the data in the form of a beacon code obtained from the beacon 332 represents the location information, in that the code is associated with the particular beacon and hence with the beacon's location in the establishment.

Data representing second parameters for handling items of baggage can then be transmitted from the remote data source 330 to the verification device 200.3. That data can then be stored in the storage memory 242 where that data, and hence the second parameters that it represents, are based on, and specific to, the location of the verification device as represented by the location information or code sent from the verification device to the remote data source.

A comparison function can then be carried out by the micro-controller 238 mutatis mutandis as described above in relation to the verification devices 200.1 and 200.2, to determine whether or not the user is to proceed with the method of handling baggage determined by use of the second parameters. Also as described above in relation to the verification device 200.1, the comparison function may indicate what other steps, if any, are to be taken based on other details presented on the display screen 240 of the verification device 200.3.

Device 200.4—to be Used with Information Based on the Unique Identification of the Device The embodiment 200.4 of the device 200 is illustrated in FIG. 12. In this embodiment, the operational criteria include that the verification device 200.4 has a unique identifier. The identifier may be unique in relation to all verification devices of the same type or model, or among other similar verification devices used within the particular establishment at which the verification device 200.4 is used, or in any other respect to enable the verification device 200.4 to be uniquely identified among other verification devices.

The unique identity of the verification device 200.4 may be embodied in a unique identifier code, or in any other suitable way. For example, the identity may be linked to a specific hardware component of the verification device 200.4, preferably by way of the component's MAC address (media access control address) and/or may be stored as a UUID (Universally unique identifier).

The verification device 200.4 may be used with remote management software which may be programmed into a remote data source 340.

Forming part of the operation criterion according to the present embodiment, is that the verification device 200.4 is adapted to transmit data to the remote data source 340 representing the unique identifier of the verification device and to prompt the remote data source to transmit data representing second parameters to the verification device, where those second parameters are based on the unique identifier. For example, the second parameters may be in accordance with a specific assignment allocated to the particular verification device 200.4.

The data representing second parameters as received from the remote data source 340 can be stored in the storage memory 242. According to a form of the present embodiment, the second parameters may be used to determine multiple different methods of handling baggage, and indeed may specify multiple different baggage handling operations, each representing a respective method of handling baggage. In this case, the user may select one or more of those methods or operations to perform, or may, for example, perform them all, one after another, or sequentially in the order in which they are presented on the display screen 240 of the verification device 200.4.

According to a form of the present embodiment, the verification device 200.4 is adapted to initiate such communications with the remote data source 340 as soon as the verification device is activated to go online on the network over which it communicates with the remote data source. Alternatively, the verification device 200.4 may be adapted to be actuated manually by the user of the device to initiate such communications.

According to a form of the present embodiment, the verification device 200.4 is adapted to be uniquely associated with a particular user. In this case, if any baggage handling tasks or actions are allocated to the verification device 200.4 based on the unique identifier of that device, the effect is as if the allocation were based on the identity of the particular user with which that device is uniquely associated.

Indeed, according to a form of the present embodiment, the verification device 200.4 may be adapted to allow a user to enter, into the device, an identifier code that is unique to that user, and for that code, or a suitable derivation of that code, to constitute the unique identifier of the verification device. A potential advantage of this form of the present embodiment is that it may avoid the need to specifically associate the verification device 200.4 and other similar devices with specific users before they begin using the devices.

A comparison function can then be carried out mutatis mutandis as described above in relation to the verification devices 200.1, 200.2 and 200.3, by the micro-controller 238 of the verification device 200.4, between first parameters represented by data read from tags 48 attached to items of baggage 46, and second parameters, that have been transmitted from the remote data source 340 and stored in the storage memory 242 of the verification device 200.4, to determine whether or not the user is to proceed with the method of handling baggage determined by use of the second parameters.

Also as described above in relation to the verification device 200.1, the comparison function may indicate what other steps, if any, are to be taken based on other details presented on the display screen 240 of the verification device 200.4.

Verification devices 200, and in particular, the embodiments of the verification devices 200.1, 200.2, 200.3, 200.4, may thus be used to obtain data representing first parameters from RFID tags 48 attached to items of baggage 46. The devices (generally referenced 200) can then compare the first parameters relating to each of the tags 48 (and hence relating to each of the items of baggage 46 to which those tags are attached) with second parameters as stored in, and retrieved from, the storage memory 242 of the respective devices, to determine whether there is a match between the respective first parameters for each bag and the second parameters. The verification devices 200 can then indicate by way of suitable, predetermined alerts (such as green and red lighting) whether there is a match in each case. This can indicate to the users of the respective verification devices 200 whether to proceed by handling the respective items of baggage in accordance methods of handling baggage determined by use of the respective second parameters, or not, and if not, what alternative steps, if any, are to be taken with the respective items of baggage.

Set out below are two Examples of use of the Verification device 200.

Use Example 1

Figure 13:
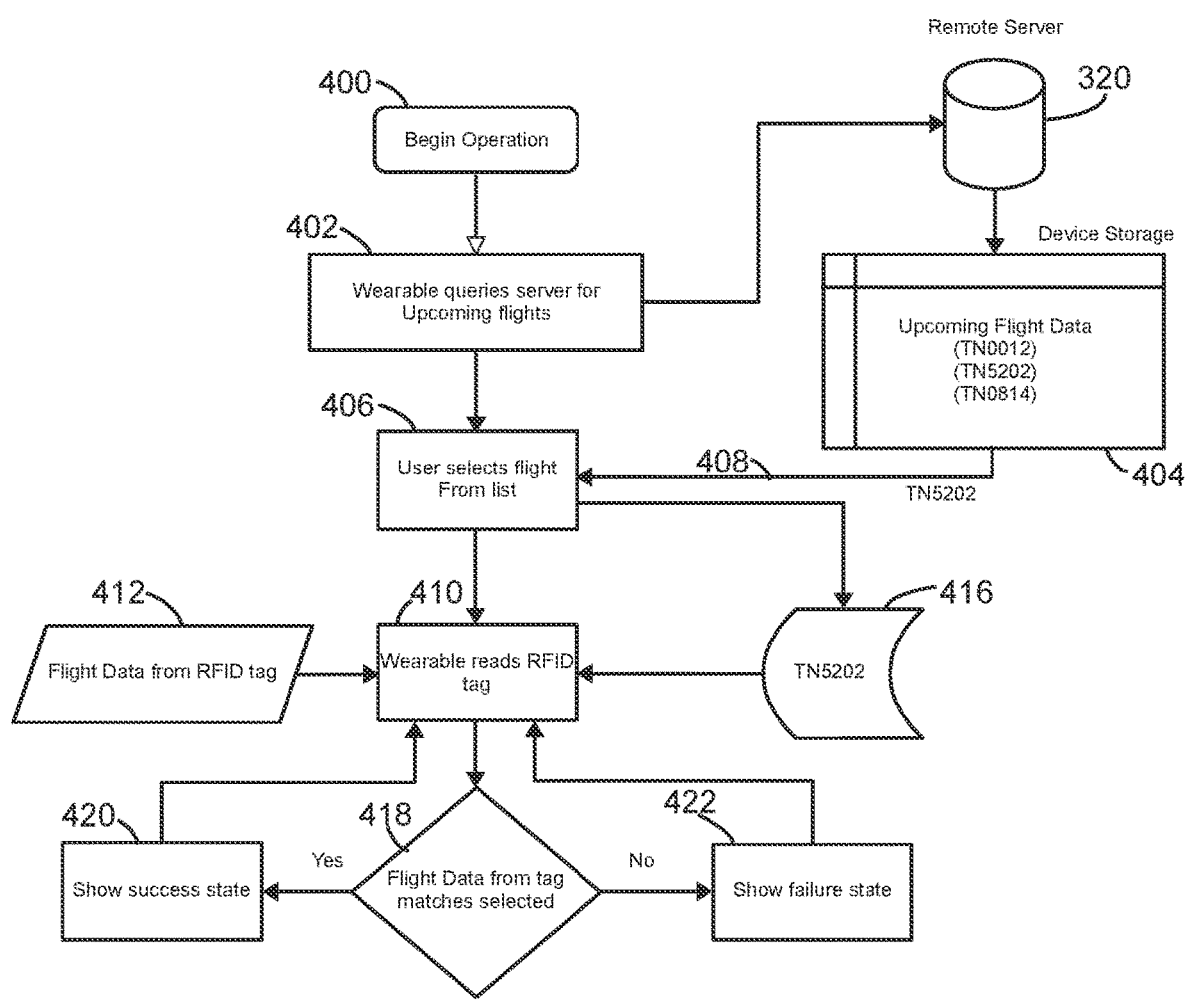
FIG. 13 is a flow diagram representing an example of a process of using a verification device according to FIG. 9.

This example involves the use of the verification device 200.1 as described above in relation to FIG. 9. A process of use of the verification device 200.1 is as illustrated in the flow diagram of FIG. 13, that process being described as follows.

The beginning of an operation of using the verification device 200.1 is indicated at 400.

The verification device 200.1 wirelessly queries the remote data source 320 for upcoming flights, as indicated at 402.

The remote data source 320 then retrieves details of upcoming flights within a particular predetermined time frame, say within the next hour, and transmits the list of those flights to the verification device 200.1 (this transmission step not being shown). This list is presented as selectable options on the display screen 240 of the verification device 200.1 as indicated at 404. According to the present example, the numbers of the flights listed are TN0012, TN5202, and TN0814.

The user of the verification device 200.1 then selects the option representing the desired flight on the verification device 200.1 as indicated at 406 by using the "up", "down" and "select" buttons as described above. The selected flight, according to the present example, is flight TN5202. The verification device 200.1 may also, according to a form of the present embodiment, have a scroll actuator (also not shown) to allow the user to scroll through the options if the whole list is too large to fit on the display screen 240 of the verification device 200.1. Data representing the selection made is transmitted to the remote data source 320.

The remote data source 320 then transmits to the verification device 200.1 data representing second parameters, being parameters to be used in determining baggage handling parameters, which in turn represent the required method for handling baggage for the selected flight (TN5202), as indicated at 408.

The user can then operate the verification device 200.1 to read data on baggage tags 48 attached to various items of baggage 46 (not shown in FIG. 13), using the RFID reader 234 of the verification device as indicated at 410.

In this manner, as indicated at 412, the verification device 200.1 acquires data from each of the tags 48. That data represents, for each tag 48, first parameters to be used in determining a method for handling the respective item of baggage 46 to which the tag is attached.

The verification device 200.1 also retrieves data representing the second parameters from the storage memory 242 of the verification device 200.1, as represented at 416.

For each tag 48 that is read by the RFID reader 234, the micro-controller 238 of the verification device 200.1 then performs a comparison, as indicated at 418, between the data representing first parameters obtained from that tag and data representing second parameters retrieved from the storage memory 242, to determine if there is a match.

If there is a match, this indicates that a "success state" has been achieved as indicated at 420. According to the present example, this success state is represented by the display screen 240 of the verification device 200.1, being illuminated with green light.

If there is not a match, then this indicates that a "failure state" has been achieved as indicated at 422. According to the present example, this is represented by the display screen 240 being illuminated with red light.

If the green light is illuminated indicating the success state, this indicates to the user of the verification device 200.1 that it is permissible to proceed with handling of the item of baggage 46 to which the particular tag 48 is attached, in accordance with the baggage handling parameters (i.e. the method of handling baggage) that have been determined by use of the second parameters represented by data stored in the storage memory 242.

A visual indication representing the second parameters and the method of handling baggage for the flight in question, are displayed on the display screen 240 of the verification device 200.1 to inform the user how to handle the item of baggage in question, that is, the required method of handling baggage.

According to a form of the present example, the matches that occur in relation to respective tags 48, are matches between the flight number forming part of first parameters represented by data read from the respective tags, and a flight number forming part of second parameters represented by data stored in the storage memory 242. Thus, according to the present form of the present example, the relevant first parameters and the relevant part of the second parameters with which there is match, are constituted by the flight number TN5202. The second parameters may be used to determine a method of handling baggage; according to the present form of the present example, this method is a predetermined method of handling baggage for the relevant flight number, TN5202. This may, for instance, be to load that baggage onto a particular identified baggage conveyor, but there may be other predetermined methods of handling baggage for other flight numbers.

According to the present example, as indicated above, the actual details of the required method of handling baggage are displayed on the display screen 240 of the verification device 200.1. In other examples, this need not be the case, and there may be other ways of the user determining the details of the particular predetermined method of handling baggage for the relevant flight number, TN5202.

If the red light is illuminated indicating a failure state, this indicates to the user of the verification device 200.1 that is not permissible to proceed with handling of the item of baggage 46 to which the particular tag 48 is attached in accordance with the baggage handling parameters (i.e. the method of handling baggage) that have been determined by use of the second parameters. Instead, other details may be presented on the display screen 240 based on data sent to the verification device 200.1 from the remote data source 320, to indicate to the user an alternative action to be taken in relation to handling of the particular item of baggage 46. In other examples, such alternative actions are not displayed.

Use Example 2

Figure 14:
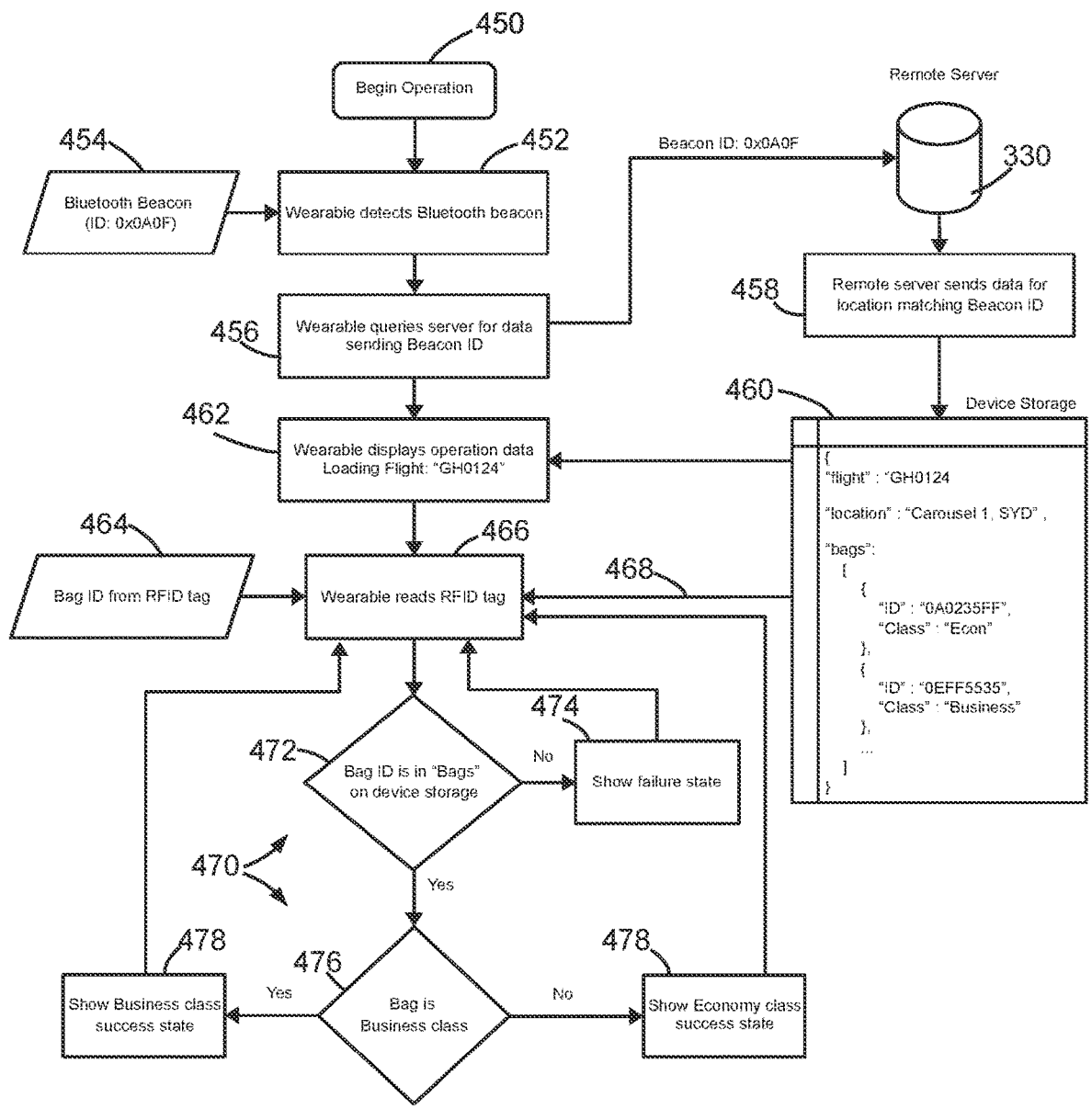
FIG. 14 is a flow diagram representing an example of a process of using a verification device according to FIG. 11.

This example involves the use of the verification device 200.3 as described above with reference to FIG. 11. A process of use of the verification device 200.3 is as illustrated in the flow diagram of FIG. 14, that process being described as follows.

The beginning of an operation of using the verification device 200.3 is indicated at 450.

When the verification device 200.3 moves into suitable proximity to a location beacon 332, it detects the presence of that beacon by detecting Bluetooth™ signals from the beacon as indicated at 454. Also as indicated at 454, the verification device 200.3 acquires a beacon identifier from the beacon 332. The beacon identifier is unique to that particular beacon 332, and therefore also serves as an identifier of the location of that beacon. According to the present example, the identifier is "0x0A0F".

As indicated at 456, the verification device 200.3 then wirelessly queries the remote data source 330, and also transmits to the remote data source the identifier of the Bluetooth beacon 332.

As indicated at 458, after receipt of the beacon identifier by the remote data source 330, the remote data source transmits, to the verification device 200.3, data based on the location of the beacon 332, which location the remote data source is able to determine based on the identifier of that beacon, at least part of that data representing relevant second parameters.

As indicated at 460, that data is then stored in the storage memory 242 of the verification device 200.3, and includes various items of information. That information or derivations of it are displayed on the display screen 240 of the verification device 200.3, as indicated diagrammatically at 462.

These items of information include the flight number "GH0124" of a particular flight to which the second parameters relate, the location of the beacon 332, namely "Carousel 1. SYD", (representing conveyor no. 1 at Sydney airport), a list of "bags" (items of baggage) belonging to passengers that are to be travelling in economy ("Econ") class on that flight, and of passengers who are to be travelling in Business class. In this example, at least the list of bags constitutes second parameters and may be used to determine a method of handling baggage.

The user of the verification device 200.3 can then operate the device to read data on baggage tags 48 attached to various items of baggage 46 (not shown in FIG. 14), using the RFID reader 234 of the verification device as indicated at 464. In this manner, as indicated at 466, the verification device 200.3 ("Wearable") acquires data from each of the tags 48. For each of the tags 48, that data represents first parameters that can be used in determining a method for handling the respective item of baggage 46 to which the tag is attached.

The verification device 200.3 also retrieves data representing the second parameters from the storage memory 242 of the verification device 200.3, as indicated at 468.

For each tag 48 that is read by the RFID reader 234, the micro-controller 238 of the verification device 200.3 then performs a comparison, as indicated, generally, at 470, between the first parameters represented by data obtained from that tag and second parameters represented by data retrieved from the storage memory 242, to determine if there is a match.

In the present example, the comparison involves a two-stage process. In the first stage, indicated at 472, the microcontroller 238, by comparing the data representing the first parameters with the data representing the second parameters, determines whether, for each RFID tag 48 that is read, a bag identifier which is included in the first parameters, matches a bag identifier of any one of the bags identified in the second parameters. The list of bags as stored in the storage memory 242 includes the identifiers of those bags.

Thus, according to this example, the first parameters for each tag 48 that is read may be constituted by the bag identifier of the bag 46 to which the respective tag is attached. Similarly, the second parameters may be constituted by the list of baggage identifiers stored in the storage memory 242. Where the identifier (first parameters) of a particular item of baggage 46 is also one of the identifiers in the list (second parameters), then there is a match between the first parameters and second parameters, where that match is constituted by the particular matching baggage identifier.

In this example, the first parameters may be regarded as being parameters that can be used for determining a method of handling baggage, for the for the following reason.

According to this example, there is one or more predetermined manner of handling the items of baggage whose identifiers are listed in the second parameters, as represented by data stored in the storage memory 242 (for example, that those items of baggage are to placed on a particular specified baggage conveyor).

The following relates to a case where there is a match between the baggage identifier forming part of the first parameters represented by data stored in and read from a particular tag 48, and a baggage identifier forming part of the second parameters represented by data stored in the storage memory 242. In this case, the matching bag identifier indicate that the item of baggage 46 to which the respective tag is attached, is to be handled in accordance with the predetermined method of handling the item of baggage listed in the second parameters.

Accordingly, the baggage identifier as read from the particular tag 48, and which constitutes the first parameters read from that tag, is used to determine that the method of handling the relevant item of baggage is the predetermined method of handling the item of baggage as listed in the second parameters.

On the other hand, the following relates to a case where there is no match between the baggage identifier forming part of the first parameters represented by data stored in and read from a particular tag 48, and any baggage identifier forming part of the second parameters represented by data stored in the storage memory 242.

In this case, the non-matching bag identifier obtained from the tag 48 indicates that the item of baggage 46 to which the respective tag is attached, is not to be handled in accordance with the predetermined method (or methods) of handling the items of baggage listed in the second parameters. In this case and similar situations, where reference is made to the first parameters being for use in determining a method of handling baggage (or similar references of corresponding meaning), this includes a reference to not taking a specific action in relation to the baggage.

The microcontroller 238 is adapted to indicate, as indicated at 474, based on the first stage of the comparison process, whether there is a match or no match in the data retrieved from the storage memory 242 for the particular bag identifier retrieved from the RFID tag. If there is no match, this indicates a "failure state", which is indicated on the verification device 200.3, by means of the display screen 240 being illuminated in red light. This indicates to the user that the user is not to handle the item of baggage in accordance with the predetermined manner of handling baggage for the baggage items identified in the list; where there is more than one predetermined manner of handling baggage for the different baggage items identified in the list, display screen 240 being illuminated in red light indicates to the user that the user is not to handle the item of baggage in accordance any of those predetermined ways of handling baggage.

The second stage of the comparison process, as indicated at 476, is only activated in the event that there is a match between the bag identifier read from the tag 48 attached to a particular item of baggage 46, and a bag identifier in the list of bags in the data representing second parameters, retrieved from storage memory 242.

In that second stage of the comparison process indicated at 472, the microcontroller 238 will perform a comparison to determine if the data representing first parameters as obtained from the RFID tag 48 contains an indicator indicating that the item of baggage 46 to which that particular tag is attached belongs to a passenger who is to be travelling in Business class. If there is such a match as indicated at 478, then this signifies that the item of baggage 46 is to be handled in a manner according to applicable predetermined rules pertaining to business class baggage. If there is no such indicator in the data representing first parameters as indicated at 480, this signifies that the baggage 46 is to be handled in a manner according to predetermined rules pertaining to economy class baggage.

It will be appreciated that whether the baggage 46 is indicated as being Business class baggage or economy class baggage, both situations represent a "success state" in the comparison process performed by the microcontroller 238.

However, in this example, the verification device 200.3 is adapted to display additional information on the display screen 240, indicating to the user of the device that the baggage 46 is to be handled as Business class baggage, or economy class baggage as the case may be.

In an alternative embodiment, the display screen 240 may be lit in different colors depending on whether the baggage is to be handled as Business class baggage or economy class baggage.

According to preferred forms of the embodiments described with reference to the verification device generally referenced 200 (and the embodiments of the verification devices numbered 200.1, 200.2, 200.3 and 200.4), the remote data sources 310, 320, 330 and 340 are each in the form of a server. However, in other forms of those embodiments, the remote data sources might not specifically be in the form of servers, but may be constituted by other devices which can perform similar functions to those described above in relation to those embodiments.

Although the invention is described with reference to specific embodiment above, it is not limited to those embodiments but may be embodied in many other forms as limited only by the claims.

For example, while the above examples indicate that the signal issued in the event of a match between the tag data and journey information include green lighting on the display screen 40, other colors may be used instead (preferably not red which is preferably reserved for a non-match situation). For example, a different color, say purple, may be used where there is a match and the baggage is to be handled on high-priority basis. That color can quickly and at a glance alert the user to that priority basis without the need to note the relevant indicia on the screen pertaining to that priority.

Also, while embodiments of the invention are described in relation to journeys involving flights, they may apply to journeys using other modes of transport, such as road transport, rail transport or transport on water.

In addition, each of the embodiments of the invention described with reference to the verification devices 200.1, 200.2, 200.3, and 200.4 may used, as far as practicable and useful, with one or more of the features of any other of those embodiments and each such combination may be an embodiment of the invention in its own right.

The invention claimed is:

1. A baggage handling verification device for use with baggage to which is fixed an RFID baggage tag containing data, the device including:
   a device user interface adapted to emit user-detectable signals;
   at least one device attachment element adapted to releasably attach the device to a part of the body, other than the hands, of a user of the device;
   an RFID signal receiving antenna;
   an RFID reader adapted to read data received by the antenna from the tag, that data representing first parameters for use in determining a manner of handling baggage;
   data memory adapted for storing data representing second parameters for use in determining a manner of handling baggage; and
   a CPU adapted
      to compare the first parameters represented by data read by the RFID reader with the second parameters represented by data stored in the data memory,
      to determine if there is a match between the first parameters and second parameters,
      to cause the user interface to emit at least one first predetermined user-detectable signal if the CPU determines that there is a match between the first parameters and second parameters and
      to cause the user interface to emit at least one second predetermined user-detectable signal if the CPU determines that there is no match between the first parameters and second parameters
   wherein the baggage handling verification device is adapted to enable acquiring of the data representing second parameters from a remote data source not being the RFID baggage tag, prior to storage of that data in the data memory,
      to have an operational criterion, and
      to enable acquiring of the data representing second parameters from the remote data source only if said operational criterion is met.

2. The baggage handling verification device of claim 1 wherein the remote data source is an electronic, data handling, companion device, wherein said operational criterion is that the verification device is adapted to be connected to the companion device so as to enable transfer of electronic data between the verification device and the companion device, with the verification device being in such proximity to the companion device that a user using the verification device by hand can simultaneously, by hand, operate the companion device, thereby to enable the user to cause the data representing second parameters to be transferred to the verification device from the companion device.

3. The baggage handling verification device of claim 1 wherein said operational criterion is that the verification device is adapted to prompt the remote data source to initiate a data obtaining process for transferring the data representing second parameters from the remote data source to the verification device.

4. The baggage handling verification device of claim 3, adapted
   to enable selection by the user, as part of said data obtaining process, of any one of a plurality of selectable options wherein each of said options corresponds to a respective available selection of second parameters; and
   if an option of said plurality of options is selected, to transmit to the remote data source data indicating the selected option.

5. The baggage handling verification device of claim 1 wherein said operational criterion is that the verification device is adapted to store location information being information about a location of the verification device, and to transfer data representing the location information to the remote data source to prompt transfer of said data representing second parameters from the remote data source to the verification device with those second parameters being based on said location.

6. The baggage handling verification device of claim 5 adapted to acquire the location information from a location identifying device separate from the verification device.

7. The baggage handling verification device of claim 6 adapted to acquire the location information from the location identifying device by Bluetooth™ transmission.

8. The baggage handling verification device of claim 7 adapted to acquire the location information from the location identifying device automatically when the verification device moves into sufficient proximity to the location identifying device such that a Bluetooth™ connection is established between the verification device and the location identifying device.

9. The baggage handling verification device of claim 6 adapted to acquire the location information from the location identifying device automatically when the verification device moves into sufficient proximity to the location identifying device.

10. The baggage handling verification device of claim 1 wherein said operational criterion is that the verification device has a unique identifier and is adapted to transmit data representing said unique identifier to the remote data source and to prompt the transmission of said data representing second parameters from the remote data source to the verification device, with that data being based on the unique identifier.

11. A baggage handling verification system for use with baggage to which is fixed an RFID baggage tag containing data, the system including:
a baggage handling verification device according to claim 1; and
said remote data source.

12. The baggage handling verification system of claim 11, wherein
the remote data source is a first remote data source being an electronic, data handling, companion device;
the baggage handling verification system includes a second remote data source that is remote from the verification device and from the companion device;
the companion device is adapted to receive the data representing second parameters from the second remote data source; and
the verification device is adapted to be connected to the companion device so as to enable transfer of electronic data between the verification device and the companion device, with the verification device being in such proximity to the companion device that a user using the verification device by hand can simultaneously, by hand, operate the companion device, thereby to enable the user to cause the data representing second parameters to be transferred to the verification device from the companion device.

13. The baggage handling verification system of claim 12 wherein
the companion device is adapted to prompt the second remote data source to initiate a data obtaining process for transferring the data representing second parameters from the second remote data source to the companion device;
the second remote data source is adapted, once the initiation of said process is prompted, to transmit to the companion device initial data representing a plurality of selectable options, each of said options corresponding to a respective available selection of second parameters;
the companion device is adapted to receive said initial data and to enable selection of any one of the selectable options by the user, and if an option of said plurality of options is selected, to transmit to the second remote data source data indicating the selected option;
the second remote data source is adapted to transmit the data representing second parameters from the second remote data source to the companion device wherein the second parameters correspond to the selected option; and
the companion device is adapted to transfer, to the verification device, the data representing second parameters corresponding to the selected option as received from the second remote data source.

14. The baggage handling verification system of claim 12 wherein the companion device is a mobile smart phone.

15. The baggage handling verification system of claim 11 wherein
the verification device is adapted to prompt the remote data source to initiate a data obtaining process for transferring the data representing second parameters from the remote data source to the verification device;
the remote data source is adapted, when the initiation of said process is prompted, to transmit to the verification device initial data representing a plurality of selectable options, each of said options corresponding to a respective available selection of second parameters;
the verification device is adapted to receive said initial data and to enable selection of the selectable options by the user, and if an option is selected, to transmit to the remote data source data representing the selected option; and
the remote data source is adapted to transfer data representing the second parameters corresponding to the selected option, from the remote data source to the verification device.

16. The baggage handling verification system of claim 11 including a location identifying device separate from the verification device, wherein
the verification device is adapted to acquire location information from the location identifying device, wherein the location information is information about a location of the verification device; and
the verification device is adapted to transfer data representing the location information to the remote data source to prompt the transfer of said data representing second parameters from the remote data source to the verification device with those second parameters being based on said location.

17. The baggage handling verification system of claim 11, wherein
the verification device has a unique identifier and is adapted to transmit data representing said unique identifier to the remote data source and to prompt the remote data source; transmission of said data representing second parameters from the remote data source to the verification device, with that data being based on unique identifier; and
the remote data source is adapted on being prompted by the verification device to transmit the data representing second parameters from the remote data source to the verification device, with that data being based on the unique identifier.

18. A method of determining whether an item of baggage, to which is fixed an RFID tag, is to be handled in accordance with predetermined parameters relating to a manner of handling baggage, wherein data contained in the tag represents first parameters for use in determining a method of handling baggage, the method including:
providing a baggage handling verification device according to claim 1;
causing the verification device to be releasably attached to a part of the body, other than the hands, of a user of the device by the at least one device attachment element;
causing the RFID reader to read data received by the antenna from the tag, that data representing said first parameters;
allowing the CPU to compare the first parameters with second parameters for use in handling baggage, represented by data stored in the data memory to determine if there is a match between the first parameters and second parameters, whereby
- the user interface emits at least one first predetermined user-detectable signal if the CPU determines that there is a match between the first parameters and second parameters, and
- the user interface emits at least one second predetermined user-detectable signal if the CPU determines that there is no match between the first parameters and second parameters; and determining that the item of baggage is to be handled in accordance with predetermined handling parameters for handling baggage, relating to the second parameters, if the user interface emits said at least one first predetermined user-detectable signal, and that the item of baggage is not to be handled in accordance with the predetermined handling parameters if the user interface emits said at least one second predetermined user-detectable signal.

19. A method of determining whether an item of baggage, to which is fixed an RFID tag, is to be handled in accordance with predetermined parameters relating to a manner of handling baggage, wherein data contained in the tag represents first parameters for use in determining a method of handling baggage, the method including:
- providing a baggage handling verification system comprising a device according to claim 1 and a storage memory separate from the device;
- causing the verification device to be releasably attached to a part of the body, other than the hands, of a user of the device by the at least one device attachment element;
- causing the RFID reader to read data received by the antenna from the tag, that data representing said first parameters;
- allowing the CPU to determine whether there is a match between the first parameters and second parameters for use in handling baggage obtained from the storage memory, whereby
  - the user interface emits at least one first predetermined user-detectable signal if the CPU determines that there is a match between the first parameters and second parameters, and
  - the user interface emits at least one second predetermined user-detectable signal if the CPU determines that there is no match between the first parameters and second parameters; and
- determining that the item of baggage is to be handled in accordance with predetermined handling parameters for handling baggage, relating to the second parameters, if the user interface emits said at least one first predetermined user-detectable signal, and that the item of baggage is not to be handled in accordance with the predetermined handling parameters if the user interface emits said at least one second predetermined user-detectable signal.

* * * * *